United States Patent
Obara et al.

(10) Patent No.: US 6,870,169 B2
(45) Date of Patent: Mar. 22, 2005

(54) METHOD AND APPARATUS FOR ANALYZING COMPOSITION OF DEFECTS

(75) Inventors: Kenji Obara, Ebina (JP); Yuji Takagi, Kamakura (JP); Hisae Shibuya, Chigasaki (JP); Naoki Hosoya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/735,575

(22) Filed: Dec. 11, 2003

(65) Prior Publication Data

US 2004/0126909 A1 Jul. 1, 2004

(30) Foreign Application Priority Data

Dec. 11, 2002 (JP) ........................................ 2002-359577

(51) Int. Cl.[7] .......................... H01L 21/66; G01R 31/26
(52) U.S. Cl. .................... 250/492.2; 250/306; 250/307; 250/310; 250/492.1; 438/14; 356/237.1; 382/145
(58) Field of Search .......................... 250/492.2, 492.1, 250/306, 307, 310; 438/14; 356/237.1; 382/145

(56) References Cited

U.S. PATENT DOCUMENTS 6,476,913 B1 * 11/2002 Machida et al. ............ 356/394
6,480,279 B2 * 11/2002 Nara et al. .................. 356/394
6,792,359 B2 * 9/2004 Ninomiya et al. ............ 702/35

FOREIGN PATENT DOCUMENTS

| JP | 01-143127 | 6/1989 |
|----|-----------|--------|
| JP | 08-021803 | 1/1996 |
| JP | 08-148111 | 6/1996 |
| JP | 10-027833 | 1/1998 |
| JP | 2000-030652 | 1/2000 |

* cited by examiner

Primary Examiner—Nikita Wells
(74) Attorney, Agent, or Firm—Townsend and Townsend and Crew LLP

(57) ABSTRACT

In order to be able to detect an irradiation position of an electron beam matching a defect position and conduct composition analysis of a defect with high precision and high efficiency, in the present invention, when a composition analysis target defect is selected and irradiation conditions of the electron beam are set for EDX analysis, a low-resolution reference image of low resolution is acquired using the electron beam at a defect corresponding position corresponding to the position of this defect on a chip in the vicinity of a target chip including defects, and a low-resolution defect image of the same low resolution is next acquired at the defect position of the target chip. Then, by comparing these low-resolution images, the defect position is acquired, the electron beam is slanted and irradiated on this defect position to acquire a composition spectrum of the defect.

23 Claims, 21 Drawing Sheets

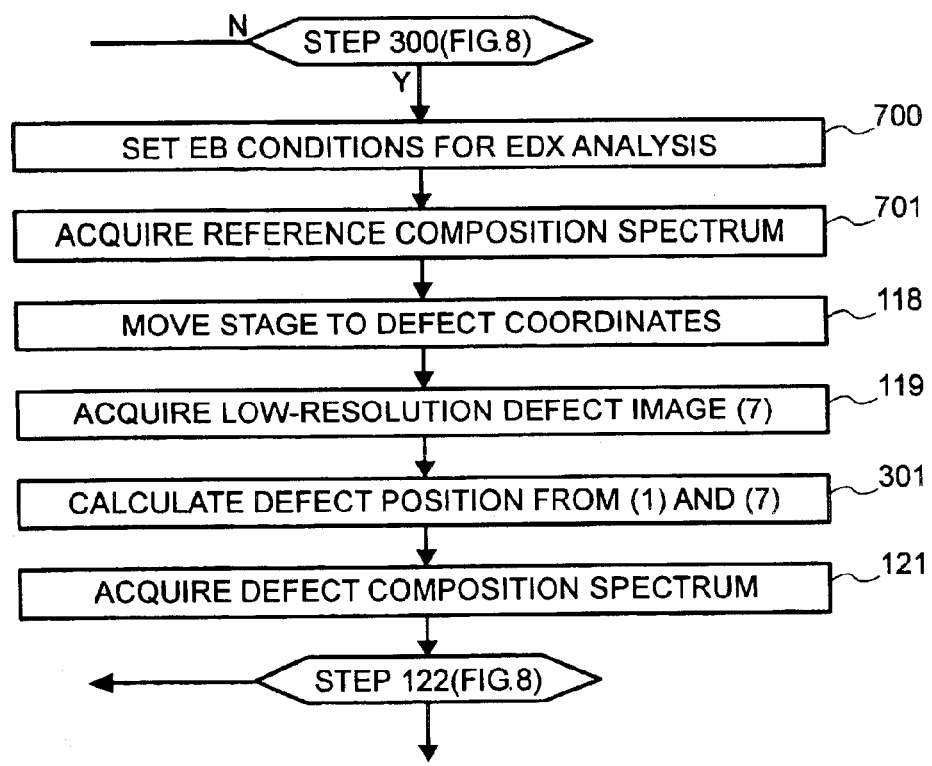
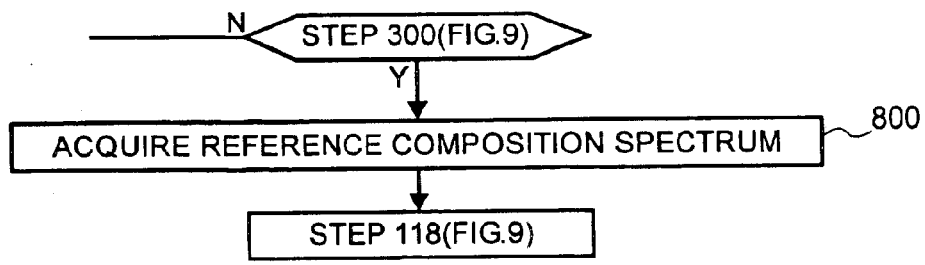

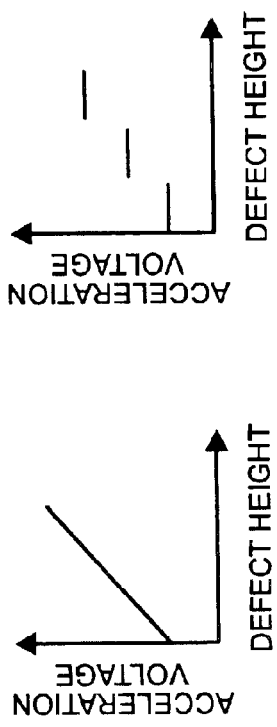
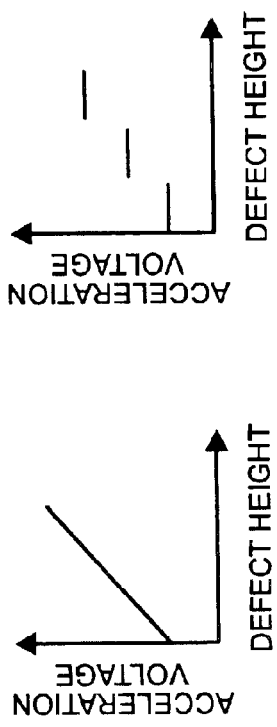
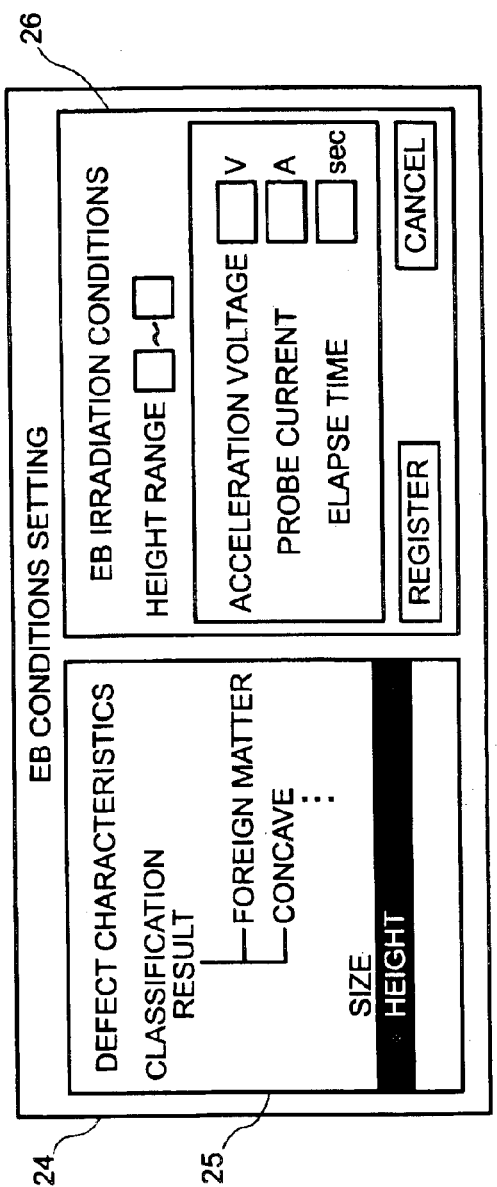

FIG.26
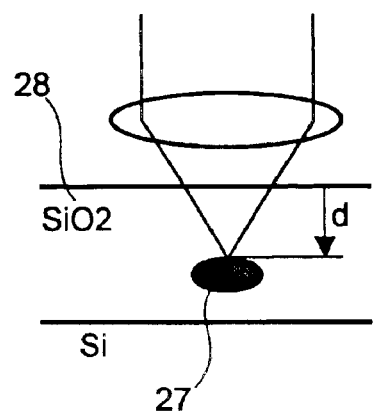
FIG.27A     FIG.27B
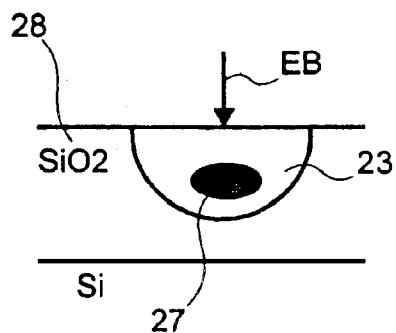 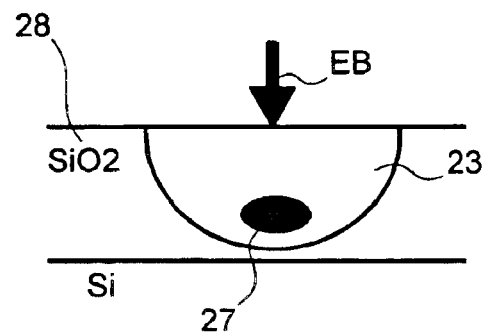

FIG.30

| EB CONDITIONS SETTING | | | |
|---|---|---|---|
| STEP REGISTRATION NAME | W DEPO 5 | REFERENCE | |
| FILM MATERIAL NAME | W | REFERENCE | |
| FILM THICKNESS | 50 | nm | |

METHOD AND APPARATUS FOR ANALYZING COMPOSITION OF DEFECTS

BACKGROUND OF THE INVENTION

The present invention relates to a method and device that are mainly used in the production process of semiconductor electronic circuits and are for reviewing and analyzing, on the basis of inspection information, the composition of particles and defects generated on a semiconductor wafer.

The production of semiconductor devices is configured by numerous processes. These can be broadly divided into a substrate step for creating transistor elements on a substrate and a wiring step for creating wirings that connect these elements. These steps are respectively configured by a combination of plural processes, such as a thin-film deposition process, a photo lithography process, an etching process, an impurity doping process, a anneal process, a polarization process and a cleaning process. The number of such manufacturing steps can sometimes reach several hundreds of steps.

When defects and particles are generated on a semiconductor wafer due to inadequacies or abnormalities in the production conditions of the manufacturing device, the probability that defects will be generated in the products becomes higher and results in lowering yield. Thus, inspections such as particles inspection and pattern inspection are implemented for each main process, and observation is conducted to determine whether or not manufacturing has been conducted normally. Additionally, measures are administered to corresponding devices when abnormalities arise. In this case, because it is impossible to implement inspection of all wafers for each manufacturing process because of time and energy constraints, ordinarily inspections are implemented with respect to sampled lots and wafers per step comprising several processes (process group).

Namely, as shown in FIG. 4, several of lots and wafers processed by a process group A comprising plural processes are sampled, and an inspection is conducted to determine whether or not the sampled lots and wafers are normal, i.e., to determine whether or not occurrences of defects and particles are within a normal range. When everything is normal, the routine proceeds to a step comprising a next process group B. When everything is not normal, a detailed inspection of detected defects and particles is conducted. From the results of this inspection, the production device, such as a manufacturing device, that caused the defects and particles (i.e., the problematic device) is identified from among the devices that executed the process group A, and a measure is devised with respect to the problematic device to ensure that defects and particles do not arise.

The inspection device scans the wafer surface with a laser to detect the presence of scattered light, or imports the shape of a pattern as an image and compares this with another image of the same pattern region, whereby information relating to the position and number of singularities can be obtained. Here, "singularities" refers to points outputted as points where abnormalities have been discovered by the inspection of the inspection device. Below, both particles and pattern defects will be referred to as defects.

Monitoring to determine whether or not the production devices are normal is often conducted using the number and density of defects detected by the inspection device as a management index. When the number of defects exceeds a preset standard value, it is determined whether or not an abnormality has occurred in the production device. As shown in FIG. 5, changes in a wafer map, which are position information of defects obtained from the inspection device, are studied, the defects are magnified and imaged on the basis of the wafer map information using a review device such as an optical microscope or a scanning electron microscope (referred to below as an "SEM"), detailed information such as the size, shape and texture of the defects is obtained, a detailed inspection such as composition analysis or cross-sectional observation is conducted, and the production device in which the problem occurred and the nature of the problem are identified. Then, on the basis of the result of the inspection, a measure with respect to the production device or process is conducted to prevent a drop in yield.

In recent years, on the basis of inspection data from particles inspection devices and pattern inspection devices, review devices that include the function of automatically obtaining a magnified image of particles and defects (Automatic Defect Review; referred to below as "DR") have been developed (e.g., see JP-A-2000-30652). Methods that automatically classify acquired images (Automatic Defect Classification; referred to below as "DC") are also known (e.g., see JP-A-8-21803).

Here, when composition analysis is implemented with respect to defects, it is necessary to reliably irradiate an energy beam for analysis on to the defects. Although designation of the irradiation position of this beam is commonly conducted with human hands, it is preferable to conduct designation automatically when the number of defects is large because it requires time. Also, the amount of time necessary for composition analysis is usually long in comparison with the amount of time necessary for the review. For this reason, sometimes the target of the composition analysis is narrowed down when the number of defects is large. Because it requires time when this narrowing-down is also conducted by human hands, it is preferable to conduct narrowing-down automatically when the number of defects is large.

With respect to this composition analysis, methods have been proposed where analysis is executed in an SEM disposed with an energy dispersive X-ray spectrometer (referred to below as an "ED") that obtains composition information by irradiating an electron beam towards detected defects and analyzing the energy of characteristic X-rays emitted from the defects (e.g., see JP-A-8-148111 and JP-A-10-27833). Also, methods for obtaining more detailed information from the observed target, e.g., methods for obtaining a three-dimensional shape from an SEM image, are known (e.g., see JP-A-1-143127).

In order to automatic composition analysis, it is necessary to control with high precision the positions of the defects and the irradiation position of the electron beam for analysis so that the electron beam hits the defects. However, error is included in the coordinates obtained from the inspection device. A stage of the SEM on which the defect analysis targets, such as wafers and lots, are placed is moved on the basis of these coordinates for the composition analysis, whereby error is included even if the defect positions are set to coincide with the irradiation position of the electron beam. Moreover, in addition to this, a setting error is also included in the stage position of the SEM (thus, defect positions). For this reason, it is difficult to reliably irradiate the electron beam on defects of a size close to the error dimension of the stage. In the conventional examples of each of the aforementioned patent publications, consideration is not given to highly precise and efficient control methods that can reliably irradiate the electron beam on defects of this size.

Also, conditions in which the composition of defects is analyzed by the state of the number of defects and steps (size of the defects, whether the defects are present on the surface or inside, etc.) Or the material of surface films differ. However, in the aforementioned conventional examples, consideration is not given to such circumstances, and when composition analysis is automatically carried out, the same analysis conditions must be set even if there are changes in such circumstances.

SUMMARY OF THE INVENTION

The present invention eliminates these problems and provides a method and device for analyzing the composition of defects that can observe defects and analyze the composition of the defects with high precision and high efficiency.

That is, the present invention is a method of analyzing the composition of defects by irradiating an energy beam on a defect of a device, the method including the steps of: acquiring a position of a target defect of composition analysis of the device; setting an irradiation position of the energy beam to match the acquired position of the target defect of composition analysis by controlling the irradiation position of the energy beam at the device in a state where the device is positioned; and irradiating the energy beam on the set irradiation position to acquire data for analyzing the composition of the target defect of composition analysis.

The present invention is also a method of analyzing the composition of a target defect of composition analysis by using a defect, selected from defects to which processing for observation on a device has been effected, as a target of composition analysis and irradiating an energy beam on the target defect of composition analysis, the method including the steps of: positioning the device on the basis of information relating to the target defect of composition analysis obtained by the processing for observation; acquiring a position of the target defect of composition analysis on the positioned device; controlling an irradiation position of the energy beam at the device to set the irradiation position of the energy beam to match the acquired position of the target defect of composition analysis; and irradiating the energy beam on the set irradiation position to acquire data for analyzing the composition of the target defect of composition analysis.

The present invention is also a method of analyzing the composition of a target defect of composition analysis by using a defect, selected from defects to which processing for observation on a device has been effected, as a target of composition analysis and irradiating an energy beam on the target defect of composition analysis, the method including the steps of: determining, after the processing for observation, whether or not the defect on the device is to become a target defect of composition analysis; acquiring a position of the determined target defect of composition analysis; setting an irradiation position of the energy beam to match the acquired position of the target defect of composition analysis by controlling the irradiation position of the energy beam at the device in a state where the device is positioned; and irradiating the energy beam on the set irradiation position to acquire data for analyzing the composition of the target defect of composition analysis.

Moreover, the present invention is a device for analyzing the composition of defects by irradiating an energy beam on a defect of a device, the device including: means for acquiring a position of the defect of the device using an image acquired by imaging the device; means for setting an irradiation position of the energy beam to match the acquired position of the defect by controlling the irradiation position of the energy beam at the device in a state where the device is positioned; and means for irradiating the energy beam on the set irradiation position to acquire data for analyzing the composition of the defect.

The present invention is also a device for analyzing the composition of a target defect of composition analysis by using a defect, selected from defects to which processing for observation on a device has been effected, as a target of composition analysis and irradiating an energy beam on the target defect of composition analysis, the device including: means for positioning the device on the basis of information relating to the target defect of composition analysis obtained by the processing for observation; means for acquiring a position of the target defect of composition analysis on the positioned device; means for controlling an irradiation position of the energy beam at the device to set the irradiation position of the energy beam to match the acquired position of the target defect of composition analysis; and means for irradiating the energy beam on the set irradiation position to acquire data for analyzing the composition of the target defect of composition analysis.

Also, the present invention is a device for analyzing the composition of a target defect of composition analysis by using a defect, selected from defects to which processing for observation on a device has been effected, as a target of composition analysis and irradiating an energy beam on the target defect of composition analysis, the device including: means for determining, after the processing for observation, whether or not the defect on the device is to become a target defect of composition analysis; means for acquiring a position of the determined target defect of composition analysis; means for setting an irradiation position of the energy beam to match the acquired position of the target defect of composition analysis by controlling the irradiation position of the energy beam at the device in a state where the device is positioned; and means for irradiating the energy beam on the set irradiation position to acquire data for analyzing the composition of the target defect of composition analysis.

These and other objects, features and advantages of the invention will be apparent from the following more particular description of preferred embodiments of the invention, as illustrated in the accompanying drawings.

BRIEF DESCRIPTION OF THE DRAWINGS

FIG. 12 is a flow chart showing main sections of a seventh embodiment of the method of analyzing the composition of defects according to the invention;

FIG. 13 is a flow chart showing main sections of an eighth embodiment of the method of analyzing the composition of defects according to the invention;

FIGS. 24A and 24B are diagrams showing specific examples of a method for setting irradiation conditions of an electron beam in the embodiments of the method of analyzing the composition of defects according to the invention;

FIG. 25 is a diagram showing a specific example of a screen for setting the irradiation conditions of an electron beam in the embodiments of the method of analyzing the composition of defects according to the invention;

FIG. 26 is a diagram showing a specific example of a method for measuring depths of defects;

FIGS. 27A and 27B are diagrams describing differences in irradiation conditions of an electron beam in accordance with depths of defects;

FIG. 30 is a diagram showing another specific example of the screen for setting irradiation conditions of an electron beam in the embodiments of the method of analyzing the composition of defects according to the invention.

DESCRIPTION OF THE PREFERRED EMBODIMENTS

In the embodiments of the present invention described below, a device for observing (reviewing) defects and analyzing the composition of defects will be described using a semiconductor wafer. However, the present invention is not limited thereto and may be another device.

Figure 2:
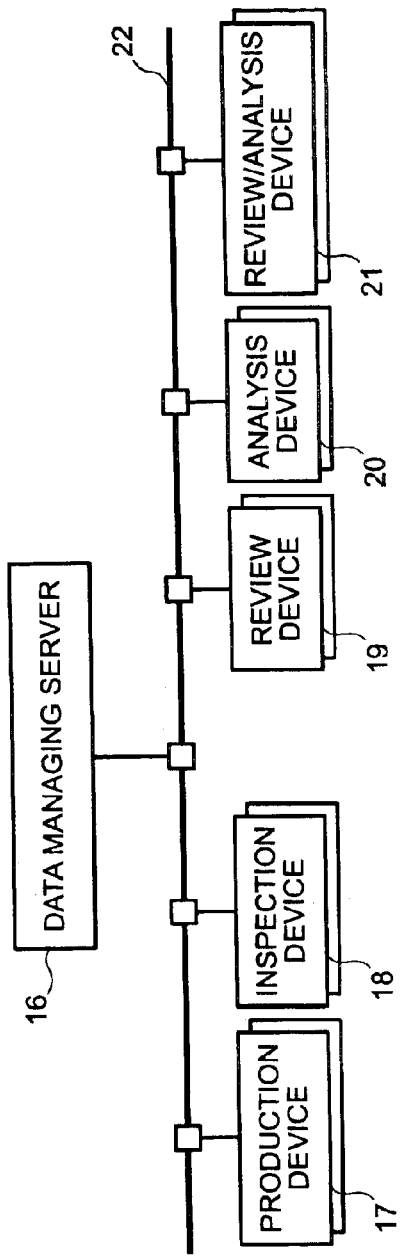
FIG. 2 is a block diagram showing a specific example of respective devices on a production line and the configuration of their connection.

First, a specific example of respective devices on a semiconductor wafer production line and the configuration of their connection will be described on the basis of FIG. 2. In FIG. 2, 16 represents a data managing server, 17 represents a semiconductor production device, 18 represents an inspection device, 19 represents a review device, 20 represents an analysis device, 21 represents a review/analysis device, and 22 represents a network.

In FIG. 2, the production line has a configuration where the semiconductor wafer production device 17, the inspection device 18, the review device 19, the analysis device 20 and the review/analysis device 21 are interconnected by the data managing server 16 and the network 22.

The production device 17 is a device used in the production of a semiconductor wafer, such as an exposure device or an etching device. The inspection device 18 is a device that inspects defect positions. For example, the inspection device 18 scans the top of the semiconductor wafer with spots of light, identifies defect positions from the degree of diffuse reflection, acquires images of patterns formed thereon from two chips, compares these images, regards portions differing between these images as defects, and detects defect positions thereof.

The review device 19 is a device that observes defects on the basis of the detection information of the inspection device 18. The review device 19 moves the stage on which the semiconductor wafer is placed, effects positioning towards defects serving as the target on the semiconductor wafer on the basis of the defect position information outputted from the inspection device 18, and conducts measurement of the defects. For example, an optical microscope or an SEM is used for the observation. The analysis device 20 is a device that analyzes the composition of the defects using an EDX or Auger electron spectroscopy.

Auger electron spectroscopy is a method that analyzes Auger electrons discharged from a target when electron rays are irradiated onto the target, and is a commonly well-known method. The review/analysis device 21 is a device configured so that it can observe defects and analyze the composition of those defects.

It should be noted that it is not necessary for these respective devices for inspection, review and analysis to be separate, and that they may be combined so that, for example, review and analysis are conducted within the same device.

The data managing server 16 is a device that manages the data obtained by the inspection device 18, the review device 19, the analysis device 20 and the review/analysis device 21. The review device 19, the analysis device 20 and the review/analysis device 21 can acquire information such as defect position coordinates outputted from the inspection device 18 via the data managing server 16.

Incidentally, although the specific example shown in FIG. 2 has a configuration where the respective devices are all interconnected via the single network 22, these devices may also be divided into several groups and a data managing server may be disposed for each group.

Figure 3:
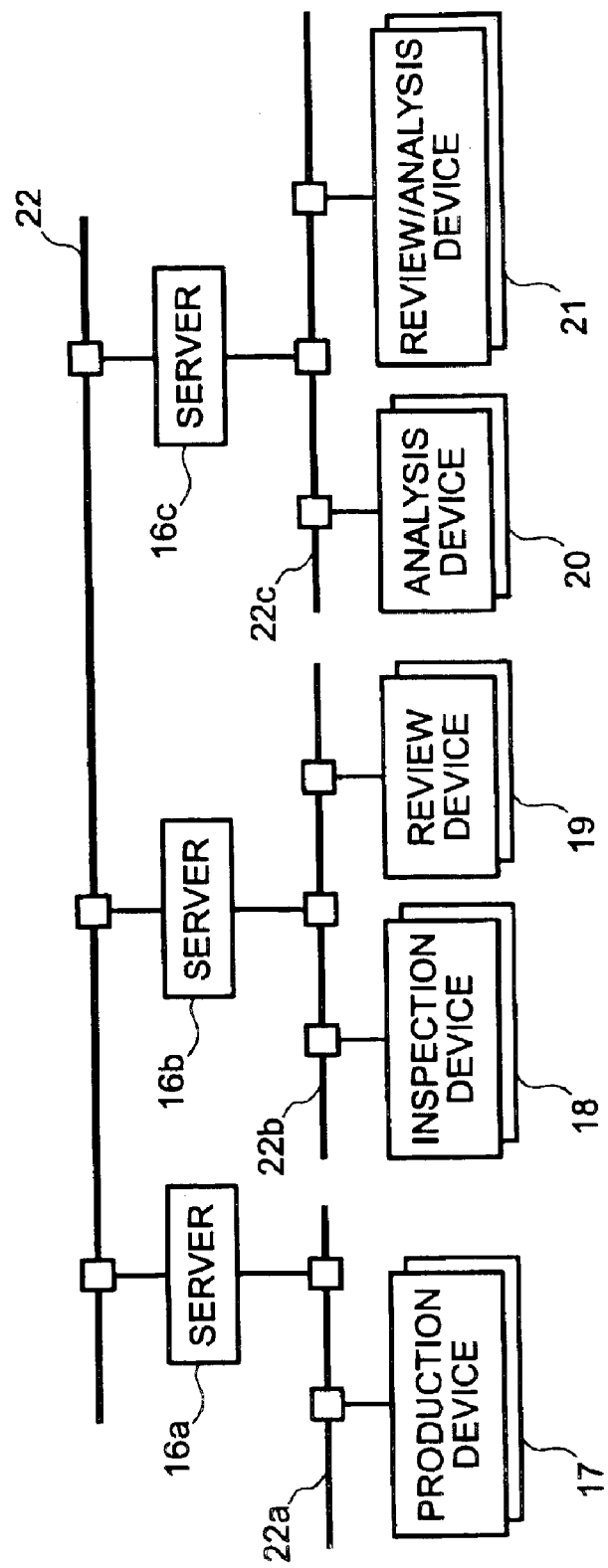
FIG. 3 is a block diagram showing another specific example of respective devices on a production line and the configuration of their connection.
Figure 4:
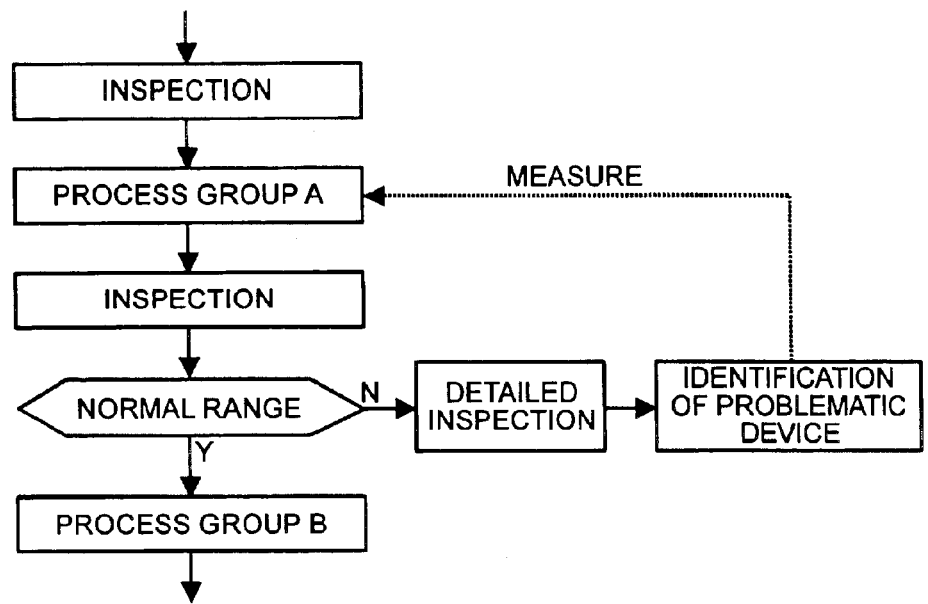
FIG. 4 is a flow chart describing the outline of steps for manufacturing a semiconductor.
Figure 5:
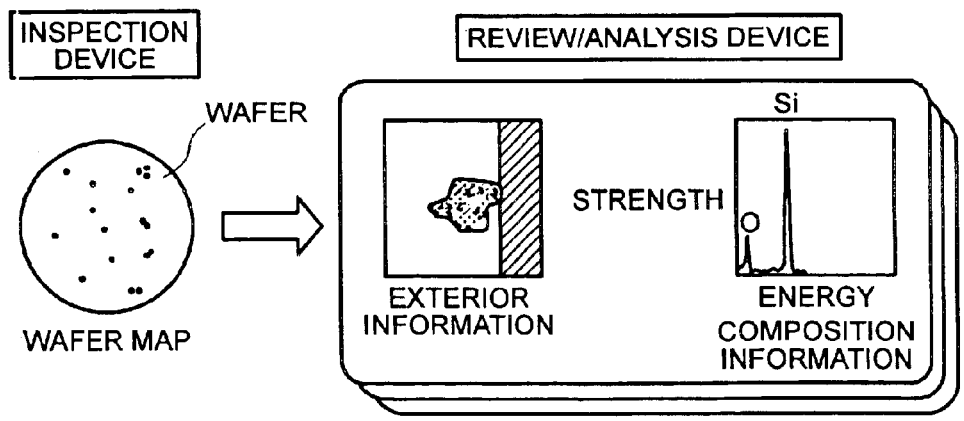
FIG. 5 is a diagram showing an example of information obtained from an inspection device and a review/analysis device.

FIG. 3 shows a specific example of such grouping. Here, the respective devices are divided into a first group that includes the production device 17, a second group that includes the inspection device 18 and the review device 19, and a third group that includes the analysis device 20 and the review/analysis device 21. In the first group, the production device 17 is connected to a data managing server 16a via a network 22a. In the second group, the inspection device 18, the review device 19 and a data managing server 16b are interconnected by a network 22b. In the third group, the analysis device 20, the review/analysis device 21 and a data managing server 16c are interconnected by a network 22c. Also, the data managing servers 16a to 16c are interconnected by the network 22.

The data obtained by the production device 17 is saved in the data managing server 16a, the data obtained by the inspection device 18 and the review device 19 is saved in the data managing server 16b, and the data obtained by the analysis device 20 and the review/analysis device 21 is saved in the data managing server 16c. Exchange of data can also be conducted between the data managing servers 16 to 16c, whereby a certain device can use the data obtained by another device. For example, the review device 19, the analysis device 20 and the review/analysis device 21 can use the data obtained by the inspection device 18.

It should be noted that, although two examples of the connection configuration of the devices and server(s) are shown in FIGS. 2 and 3, any connection configuration is possible as long as it is possible for the devices to mutually use the data.

Next, embodiments of the invention used in the connection configuration will be described.

Figure 1:
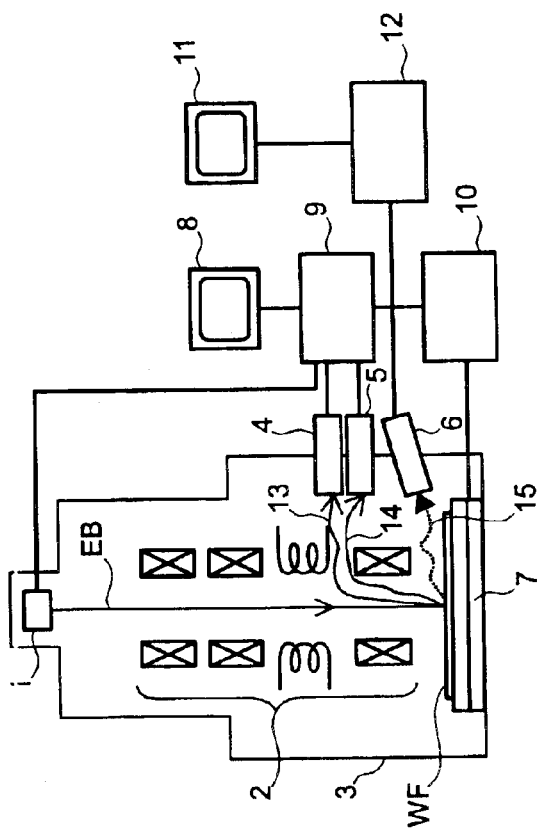
FIG. 1 is a block diagram showing an embodiment of a device for analyzing the composition of defects according to the invention.

FIG. 1 is a block diagram showing an embodiment of the device for analyzing the composition of defects according to the invention. In FIG. 1, WF represents a semiconductor wafer, EB represents an electron beam, 1 represents an electron source, 2 represents an electron-optical system, 3 represents an imaging device using a scanning electron microscope, 4 and 5 represent detectors, 6 represents a semiconductor X-ray detector, 7 represents an X-Y stage, 8 represents a monitor, 9 represents a computer, 10 represents a control device, 11 represents a monitor, 12 represents a computer, 13 represents secondary electrons, 14 represents reflected electrons, and 15 represents a characteristic X-ray. This embodiment corresponds to the review/analysis device 21 of FIG. 2.

In FIG. 1, the electron source 1, the electron-optical system 2, the detectors 4 and 5, the semiconductor X-ray detector 6 and the X-Y stage 7 configure an SEM that is used as the imaging device 3 of the semiconductor wafer WF placed on the X-Y stage 7.

The semiconductor wafer WF, which serves as the target (i.e., measurement target) for review (observation) and composition analysis, is placed on the X-Y stage 7. The X-Y stage 7 is movably controlled in X and Y directions by the control device 10 on the basis of a control signal from the computer 9. The imaging device 3 using the SEM magnifies and images the semiconductor wafer WF fixed on the X-Y stage 7. That is, the electron beam EB emitted from the electron source 1 is converged by the electron-optical system 2 and scanned, whereby the electron beam EB is irradiated onto the measurement target semiconductor wafer WF. The secondary electrons 13 and the reflected electrons 14 obtained from the semiconductor wafer WF by this irradiation are respectively detected by the detectors 4 and 5 and processed by the computer 9, so that an SEM image of the semiconductor wafer WF is generated. This SEM image can be observed (reviewed) on the monitor 8.

The semiconductor X-ray detector 6 detects the characteristic X-ray 15 discharged from defects on the semiconductor wafer WF by the irradiation of the electron beam EB, and converts the characteristic X-ray 15 into an electrical signal. This electrical signal is processed by the computer 12 and displayed on the monitor 11 as a spectrum. Because the position of the X-Y stage 7 is controlled, the imaging device 3 can observe/analyze optional positions on the semiconductor wafer WF.

It should be noted that the computer 9 can be made to conduct the processing of the computer 12 and that the electrical signal outputted from the semiconductor X-ray detector 6 can also be processed by the computer 9 to obtain the spectrum information.

Next, the operation sequence of the review/analysis device shown in FIG. 1 that is an embodiment of the device for analyzing the composition of defects according to the invention, i.e., the embodiment of the device for analyzing the composition of defects according to the invention, will be described. It should be noted that, although an embodiment of a method of analyzing the composition of defects described below is executed by the review/analysis device shown in FIG. 1, the review/analysis device is connected to other devices as shown in FIG. 2. Of course, the review/analysis device may also be connected by the connection configuration shown in FIG. 3 or by other connection configurations.

Figure 6:
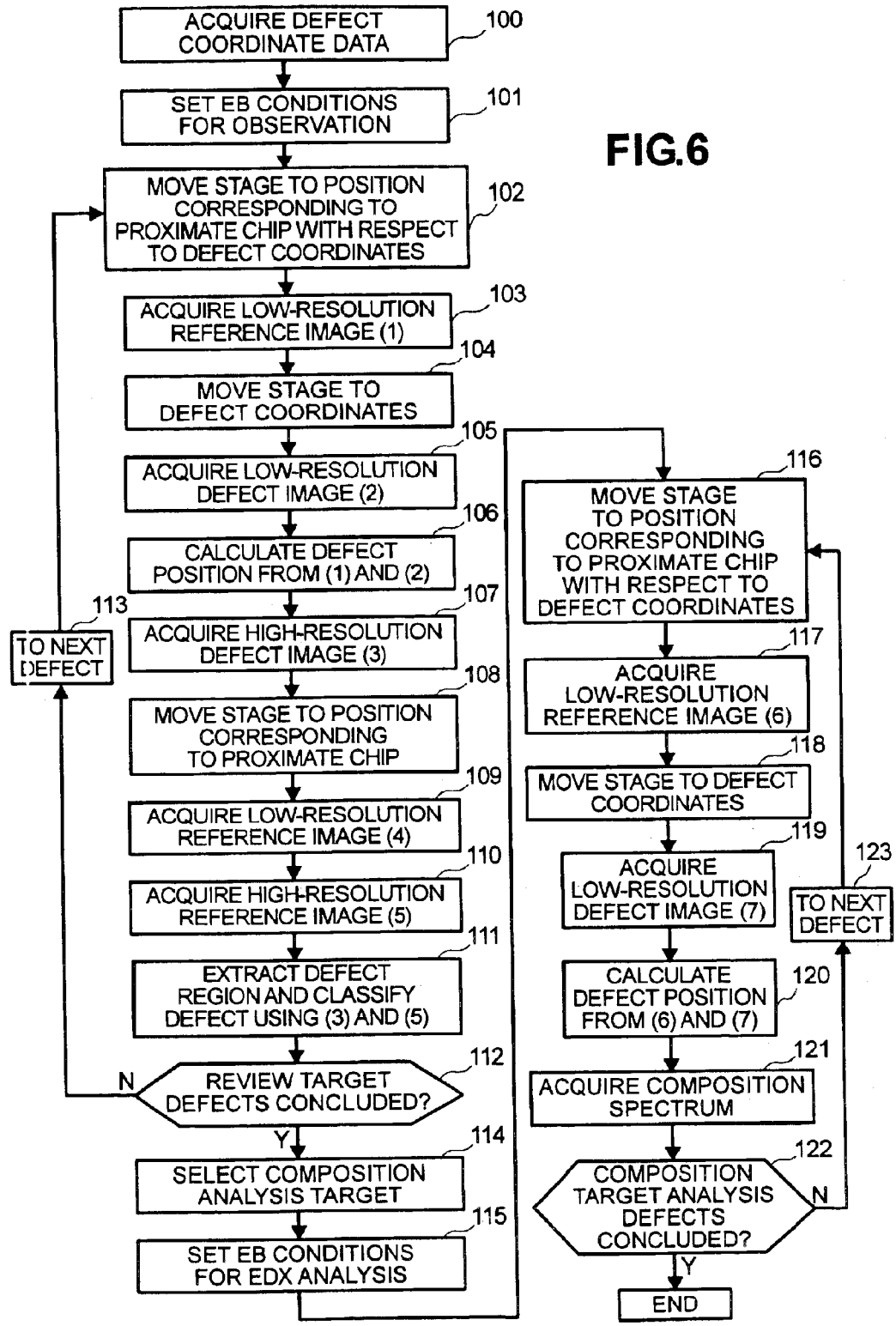
FIG. 6 is a flow chart showing a first embodiment of a method of analyzing the composition of defects according to the invention.

FIG. 6 is a flow chart showing a first embodiment of the method of analyzing the composition of defects according to the invention. The first embodiment is a case where a semiconductor wafer having a pattern on a background is used as the target.

In FIG. 6, first, defect coordinate data obtained by the inspection device 18 (FIG. 2) is acquired (step 100). This defect coordinate data is acquired by, for example, designating a lot number of a semiconductor wafer server as the target for review/analysis, a semiconductor wafer number and an inspection step, uniquely identifying the semiconductor wafer WF, and accessing the data managing server 16 (FIG. 2) via the network 22 (FIG. 2).

Next, conditions for irradiating the electron beam to be irradiated (referred to below as "the EB conditions") are set for observation (review) (step 101). Examples of the EB conditions include acceleration voltage and probe current. These are set to conditions suited for observation of a defect image (i.e., an image obtained by shooting a field of view including the defects).

Next, on the basis of the defect coordinate data acquired in step 100, a defect serving as the target for review (referred to below as "the review target defect") is selected, a shooting field of view in which a wide range can be shot at a low magnification with the review target defect as the center (referred to below as a "low-magnification shooting field of view") is set, and the X-Y stage 7 (FIG. 1) is moved so that a position (referred to below as "the reference position") corresponding to the coordinate position of the review target defect of the chip in which the review target defect is present (referred to below as "the review target chip") in another chip (e.g., an adjacent chip; referred to below as a "proximate chip") near the review target chip is centered in the shooting field of view (step 102). At this time, even if the low-magnification shooting field of view includes predictable error, such as calculation error of the defect coordinate position of the inspection device 18 or positioning error of the X-Y stage 7, a field of view size is acquired so that the review target defect is sufficiently within the low-magnification shooting field of view.

When the positioning setting of the X-Y stage 7 is effected in this manner, the inside of the low-resolution field of view of the proximate chip is scanned (i.e., imaged) with the electron beam EB (FIG. 1) in this set state, whereby an image of the inside of the low-resolution field of view is acquired as a low-resolution reference image (1) (step 103). Next, on the basis of the defect coordinate data of the inspection device 18 acquired in step 100, the X-Y stage 7 is moved so that the target defect of the review of the review target chip is centered in the low-resolution field of view (step 104).

Then, in a state where the positioning of the X-Y stage 7 has been set in this manner, the inside of the low-resolution field of view of the review target chip is shot, whereby an image of the inside of the low-resolution field of view is acquired as a low-resolution defect image (2) (step 105).

In this manner, the low-resolution reference image (1) and the low-resolution defect image (2) are obtained. Next, these images (1) and (2) aligned so that the corresponding positions thereof coincide, and the difference region thereof is calculated, whereby the position of the target defect of review (i.e., defect position) is calculated (step 106).

Then, a field of view for shooting at a high resolution of a narrow range in which the defect position calculated in step 106 is centered (referred to below as a high-resolution shooting field of view) is set and the inside of the high-resolution shooting field of view of the review target chip is shot at a high resolution, whereby a defect image of a resolution that is higher than that of the low-resolution defect image (2) (referred to below as a high-resolution defect image) (3) is acquired (step 107). At this time, the X-Y stage 7 is slanted by the electron-optical system 2 (FIG. 1) without being moved, whereby the irradiation range (shooting range) of the electron beam EB is adjusted and the high-resolution defect image (3) is obtained. In this manner, a high-resolution defect image that does not include a large error factor can be obtained because the movement of the X-Y stage 7 is not entailed.

Next, in order to obtain a reference image of high resolution (referred to below as a high-resolution reference image) corresponding to the high-resolution defect image (3), the X-Y stage 7 is moved from the position set in step 104 to the position of the proximate chip when the low-resolution reference image is acquired in step 103 (the position set in step 102) (step 108).

However, in actuality, because positioning error of the X-Y stage 7 is included, the X-Y stage 7 cannot be precisely positioned at the position set in step 102. In order to eliminate this positioning error, the background pattern of the proximate chip is used.

That is, after the X-Y stage 7 has been moved and positioned in step 108, a low-resolution shooting field of view that is the same as that of step 103 is set and the inside of this field of view is shoot at a low resolution (same resolution as in steps 103 and 105) to acquire a low-resolution reference image (4) (step 109). The acquired low-resolution reference image (4) does not coincide with the low-resolution reference image (1) acquired in step 103 when there is positioning error of the X-Y stage 7. Next, a size corresponding to the high-resolution shooting field of view in which the position of the defect calculated in step 106 of the low-resolution reference image (1) is centered is cut out and made into a template, and template matching is conducted with respect to the low-resolution reference image (4) acquired in step 109, whereby a region matching this template in the low-resolution reference image (4) (here, the background pattern is used) is sought and the center coordinate of this region is calculated.

The center coordinate is the position of the proximate chip corresponding to the defect position of the review target calculated in step 106 of the review target chip. Thus, a high-resolution shooting field of view that is the same as the high-resolution shooting field of step 7 where this center coordinate is centered on the proximate chip is set, and the inside of the high-resolution shooting field of view is shot at the same high resolution as in step 107, whereby a high-resolution reference image (5) is acquired (step 110). This high-resolution reference image (5) corresponds to the high-resolution defect image (3) acquired in step 107.

Next, difference extraction processing and positioning processing of the high-resolution defect image (3) and the high-resolution reference image (5) are conducted and the defect region of the target defect of the review of the high-resolution defect image (3) is extracted. Because the extraction of this defect region uses an image whose resolution is high in comparison to difference extraction processing for the defect position detection implemented in step 106, a defect region can be determined with greater precision. Also, with in regard to the extracted defect region, classification of the defect is conducted on the basis of characteristics such as size, luminance and texture, and attributes in the defects are imparted. Examples of the attributes include "particles" and "hollow" for attributes relating to unevenness, "white" and "black" for attributes relating to luminance, "round" and "polygonal" for attributes relating to shape, "rough" for attributes relating to the surface state, "large" and "small" for attributes relating to defect size, and "on the surface" and "embedded" for attributes relating to the layer in which the defects are present (step 111).

The above is the processing operation for review (observation) with respect to one defect.

Then, when the extraction of the defect region of the target defect of the review and defect classification end and the review operation is concluded, it is determined whether or not the review operation has been concluded for all defects that are to become targets for review (step 112). When the review operation has not been concluded, the target for review moves to the next defect (step 113) and processing is repeated from step 102 with respect to the next review target defect. When the above processing has been concluded with respect to all of the defects that are to become targets for review, the defect serving as the target for composition analysis is selected (step 114).

In the above manner, the regions of the defects serving as the targets for review are extracted, and these can be displayed on the monitor 8 (FIG. 1) and observed (reviewed).

It should be noted that, although the defects that are to become the targets for review may be all of the defects observed by the inspection device 18, defects of a number randomly set in advance can also serve as the targets. Alternatively, the defects that are to become the targets for review may be determined on the basis of the attribute information (e.g., size information, etc.) of the defects given as the inspection result of the inspection device 18.

Next, when conducting composition analysis of the defects, first, selection of the defects serving as the targets for the composition analysis (i.e., composition analysis target defects) is conducted (step 114). As the selection method of the composition analysis target defects, the defects may be selected one by one with human hands while observing the defect image on the monitor 8. Also, the result of classification by step 111 may be used to automatically select only the defects belonging to a desired classification category. By acquiring the target image in this manner, it can be used as effective information when conducting selection of the defects serving as the analysis targets.

Also, for example, when the number of defects detected on one semiconductor wafer is small, all of the defects can serve as the analysis targets or defects of a designated in advance may be randomly selected depending on the objective of the user. In such cases, it is not necessary to select the target defects for composition analysis (i.e., the processing of step 114).

Next, the EB conditions are set for EDX analysis (step 115). Then, in a state where the EB conditions are set for EDX analysis, a low-resolution reference image (6) and a low-resolution defect image (7) are acquired in the same manner as in steps 102 to 105, the positions of the target defects for composition analysis are calculated from these low-resolution images (steps 116 to 120), and the electron beam EB is irradiated on the defect positions, whereby spectrum data resulting from the EDX is acquired (step 121). Thus, one composition analysis operation of the target defect of composition analysis is concluded.

Next, it is determined whether or not there is another target defect of composition analysis (step 122). If there is, the routine moves to the next target defect of composition analysis (step 123) and the processing operation from step 116 is implemented with respect to this defect. However, when the processing operation from step 116 is effected with respect to all target defects for composition analysis, the composition analysis processing operation is concluded.

In this manner, a composition analysis result is obtained for each target defect of composition analysis and these results are displayed on the monitor 11 (FIG. 1), whereby the EDX composition spectrum is displayed and it is possible to know the composition of the defects.

As described above, in the first embodiment, because the target defects for composition analysis can be selected on the basis of the review of the defect images, narrowing-down of the target defects for composition analysis that is effective and in accordance with the standard that the user demands can be implemented.

It should be noted that, in a case where all of the defects detected by the inspection device 18 serve as targets for composition analysis or a case where the user selects defects to serve as targets for composition analysis, the processing operation for review of steps 101 to 112 is not always necessary. When only composition analysis of defects is necessary, steps 101 to 112 can be omitted.

Figure 7:
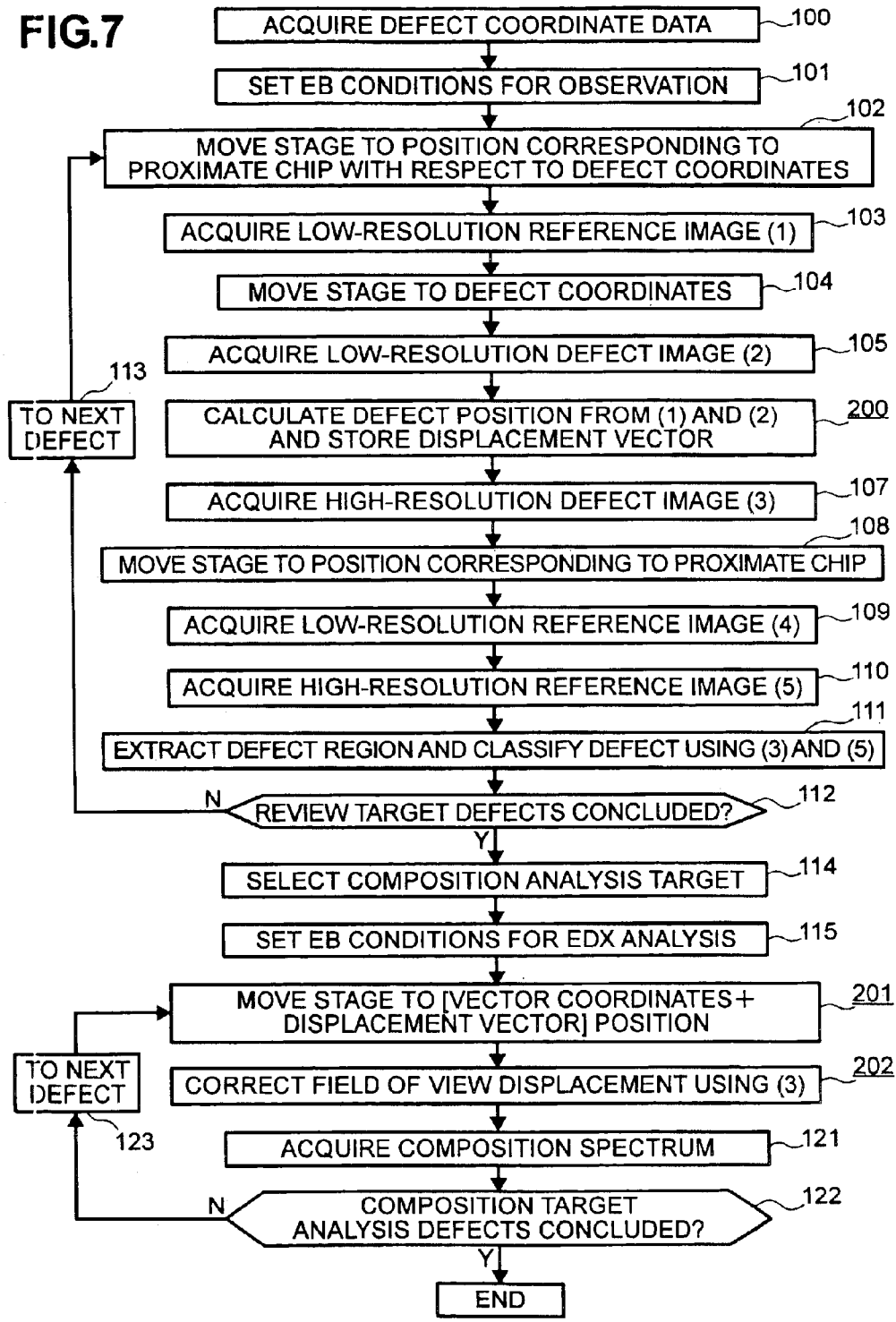
FIG. 7 is a flow chart showing a second embodiment of the method of analyzing the composition of defects according to the invention.

FIG. 7 is a flow chart showing a second embodiment of the method of analyzing the composition of defects according to the invention. The same reference numerals will be given to steps corresponding to those in FIG. 6 and overlapping description will be omitted. The second embodiment is also one where a semiconductor wafer WF including a pattern on the background is used as a target.

In FIG. 7, steps 100 to 105 are the same as those of the first embodiment shown in FIG. 6.

When the low-resolution reference image (1) is obtained in step 103 and the low-resolution defect image (2) is obtained in step 105, the defect position of the target defect for review is calculated from these low-resolution images (1) and (2) in the same manner as in step 106 in FIG. 6, and a vector (referred to below as a displacement vector) to the defect position coordinates from the center coordinates in the low-resolution shooting field of view of the review target chip whose positioning has been set in step 104 is calculated and stored. This displacement vector is a two-dimensional vector comprising X and Y components in the movement direction of the X-Y stage 7. In addition to the error of the defect position obtained by the inspection device 18 (FIGS. 2 and 3), positioning error of the X-Y stage 7 (FIG. 1) of the SEM is also included. Then, steps 107 to 111 are executed and the above review processing is conducted with respect to all defects serving as the targets for review (step 112).

When composition analysis is to be conducted, the target defects for composition analysis are selected (step 114) and the EB conditions are set for EDX analysis (step 115). Thereafter, the X-Y stage 7 is moved so that the position where the field of view center is on the proximate chip (step 108) becomes the target chip, so that the field of view center matches the defect position of the target defect of composition analysis from the displacement vector and the defect target coordinates determined in step 200 (step 201).

In this manner, when positioning is conducted using the displacement vector, positioning error of the X-Y stage 7 of the SEM is included in the displacement vector in addition to the error of the defect coordinates outputted from the defect inspection device 18 as described above. However, because the defect coordinate error outputted from the inspection device 18 is usually one digit larger in comparison to the positioning error of the X-Y stage 7, positioning can be conducted with high precision in comparison to a case where correction resulting from the displacement vector is not added. Thus, the target defects for composition analysis can be kept inside the high-resolution shooting field of view.

However, even if the X-Y stage 7 is moved on the basis of the defect coordinates and the displacement vector so that the field of view center (here the field of view center is the center of the set high-resolution and low-resolution shooting fields of view, and also refers to the irradiation position of the electron beam EB for composition analysis) moves from the proximate chip to the target chip and the position of the X-Y stage 7 is adjusted and positioned on the basis of the defect coordinates and the displacement vector so that the defect position is centered in the field of view, positioning error accompanying this movement of the X-Y stage 7 arises and the defect position is shifted from the positioning error field of view center.

In this case, in a case of a defect whose size is large, the field of view center is present inside the defect region even if there is displacement of this amount and the electron beam EB whose conditions are set for EDX analysis is irradiated in composition analysis, so that it does not become a particularly large problem. However, in the case of a defect whose size is close to or smaller than the positioning error of the X-Y stage 7, there is the potential for the region thereof to shift away from the field of view center so that the electron beam cannot hit the defect.

Thus, in the second embodiment, step 202 is disposed in order to eliminate this. That is, in step 202, the high-resolution defect image (3) acquired in step 107 is used as a template, a high-resolution shooting field of view is set on the composition analysis target chip, and this is scanned with the electron beam EB set for EDX analysis, whereby a new high-resolution defect image in this high-resolution shooting field of view is acquired, template matching processing of this high-resolution defect image and the template is conducted, and a high-resolution field of view such that the field of view center is included in the defect region of the template is searched. Thus, a high-resolution field of view where the target defect position for composition analysis coincides with the field of view center is obtained and the positioning error of the X-Y stage 7 is corrected. Thereafter, the operation from step 121 is executed and the composition spectrum of the target defect of composition analysis is acquired.

When a composition spectrum is acquired for one target defect of composition analysis, one of the remaining defects selected in step 114 becomes the next target defect of composition analysis (step 123), the processing of steps 201, 202 and 121 is implemented with respect to this target defect of composition analysis, and a composition spectrum is acquired for each target defect of composition analysis. In this manner, this processing operation is conducted for all of the defects selected in step 114 to acquire composition analysis spectrums (step 122).

In this manner, in the second embodiment of the method of analyzing the composition of defects, effects that are the same as those of the first embodiment shown in FIG. 6 are obtained. Additionally, because it becomes unnecessary to acquire the reference images as in the first embodiment shown in FIG. 6 at the time of composition analysis, the irradiation position of the electron beam EB for composition analysis can be identified from the defect image and the amount of time necessary to identify this irradiation position can be reduced. Thus, improvement of throughput can be realized.

Here, in a case where the viewing of the defects (brightness and texture of the defects) differs due to the irradiation conditions of the electron beam EB (referred to below as EB conditions) differing, a minute filter is placed on the image, an image is created where the edge component is extracted, and template matching processing is executed with this image, whereby affects resulting from differences in the EB conditions can be eliminated.

Also, in FIG. 7, in a case where the resolutions of the high-resolution defect image (3) acquired in step 107 and the high-resolution defect image used in step 202 are different, a sufficient resolution can be supplied with these image by magnifying or reducing the high-resolution defect image (3) serving as the template by digital processing, and field of view displacement correction of step 202 can be conducted.

Here, the same effects are obtained even if the defect coordinate data acquired from the inspection device 18 is rewritten over the coordinate data of the detected defect position instead of storing the displacement vector.

Also, in FIG. 7, similar to the first embodiment shown in FIG. 6, steps 108 to 111 may be skipped depending on the selection method of the target defects for composition analysis in step 115.

Figure 8:
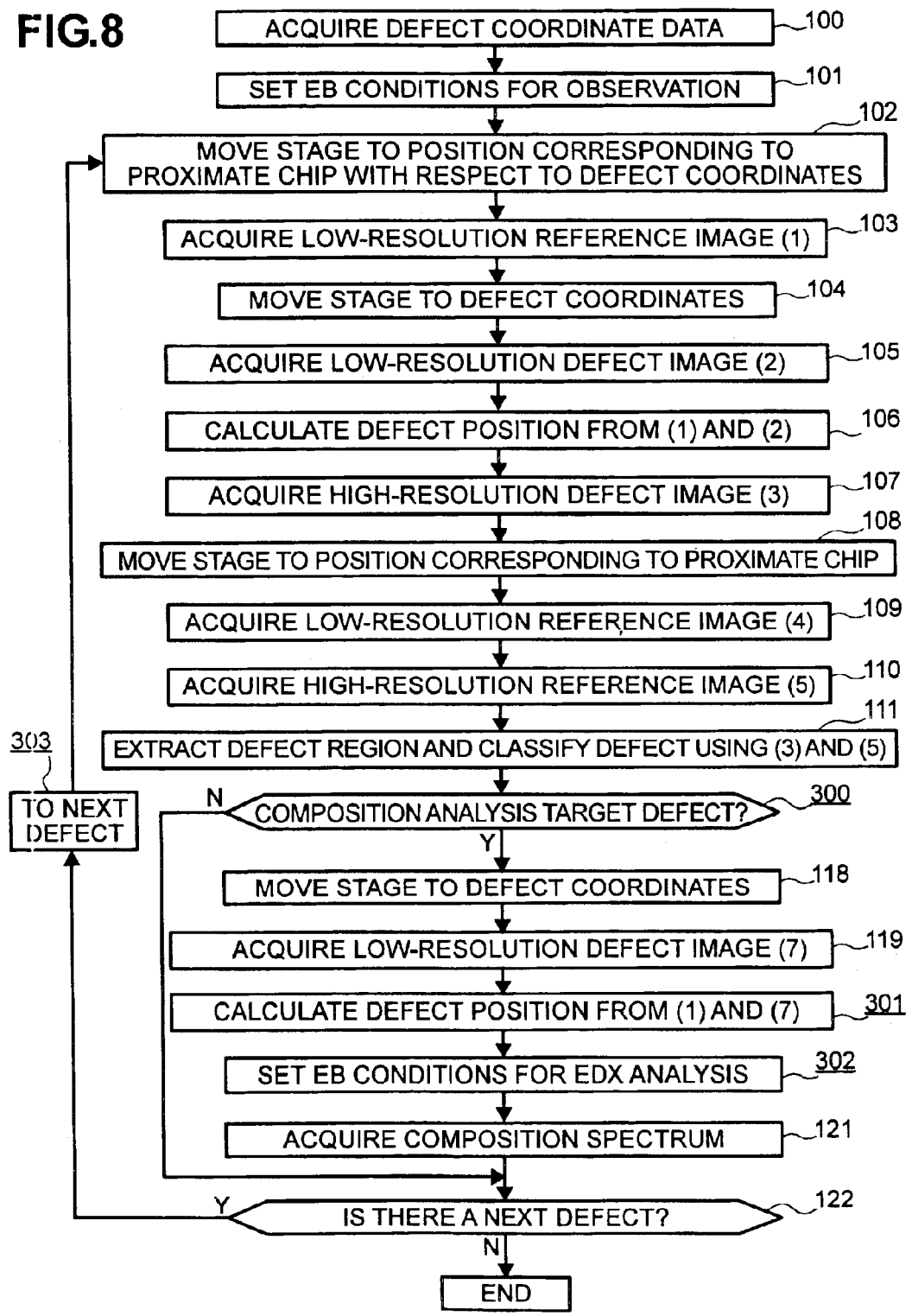
FIG. 8 is a flow chart showing a third embodiment of the method of analyzing the composition of defects according to the invention.

FIG. 8 is a flow chart showing a third embodiment of the method of analyzing the composition of defects according to the invention. The same reference numerals will be given to steps corresponding to those in FIG. 6 and overlapping description will be omitted. The third embodiment is also one where a semiconductor wafer WF including a pattern on the background is used as a target.

In FIG. 8, steps 100 to 111 are the same as steps 100 to 111 in the first embodiment shown in FIG. 6.

When classification and region detection of the target defect of review are effected in steps 102 to 111, it is next determined whether or not the review-processed defect is a target of composition analysis on the basis of preset determination conditions (step 300). Examples of these determination conditions include defect size, whether the defect has a concave or convex shape, and the texture of the defect region. When the defect is not a target of composition analysis, it is determined whether the next defect is a target of review (step 122). If there are remaining defects, one is selected for the next target defect of review (step 303) and the review processing operation from step 101 is conducted.

When the defect for which the review processing operation of steps 102 to 111 has concluded is to serve as the target of composition analysis (step 300), the X-Y stage 7 is moved in order to move the shooting field of vision from the proximate chip to the target chip and the low-resolution defect image (7) is acquired in the same manner as in step 119 of the embodiment shown in FIG. 6 (step 119). Then, using this low-resolution defect image (7) and the low-resolution reference image (1) acquired in step 103, the position of the defect, i.e., the irradiation position of the electron beam EB for composition analysis is calculated (step 301). Together with this, the EB conditions are changed from conditions for the observation until now to conditions for EDX analysis (step 302), the electron beam EB is irradiated onto the composition analysis defect and composition spectrum data is acquired (step 121).

Here, when the EB conditions are changed from conditions for observation to conditions for EDX analysis, sometimes the field of view shifts. Thus, the shift amount of the field of view per change in the EB conditions is determined in advance by advance experimentation or calculation and this is used to correct the shift. Also, the image before the EB conditions are changed may be acquired as a template and, after the EB conditions are changed, an image may be acquired at the same resolution as that of the electron beam EB after the change and, using this image and the template, template matching processing may be conducted, whereby the shift amount of the field of view is calculated, and this may be used to slant the electron beam EB with the electron-optical system 2 (FIG. 1) and correct the shift. Also, these methods may be combined to determine shift use and correct the shift.

In the above manner, the data of the composition spectrum of the target defect of composition analysis can be obtained. Then, when a defect that is to serve as the target of review remains (step 122), this is used as the next target of review (step 303), and processing from step 101 is conducted. Then, when there are no longer any defects to serve as targets for review processing (step 122), the series of processing ends.

In the first and second embodiments shown in FIGS. 6 and 7, after review processing was conducted with respect to all defects serving as targets of review, defects that are to serve as targets of composition analysis were selected from among these defects (step 114) and the processing of composition analysis was conducted with respect to the selected defects. However, in the third embodiment shown in FIG. 8, the review processing and the composition analysis processing are made into consistent processing with respect to all of the target defects of review and defects not requiring composition analysis (step 300) are limited only to the review processing.

Also, in the third embodiment shown in FIG. 8, a displacement vector may be used as in the second embodiment shown in FIG. 7, for example in step 106 of FIG. 8, the displacement vector may be stored in the same manner as in step 200 of FIG. 7, and steps 118, 119 and 301 of FIG. 8 may be replaced with steps 201 and 202 of FIG. 7.

In this manner, in the third embodiment shown in FIG. 8, because the determination of the necessity of review and composition analysis and the composition analysis are conducted as a series of operations, the processing of the review and the composition analysis is conducted as a series of operations with respect to defects requiring review and composition analysis. Thus, positioning of the X-Y stage 7 becomes easy.

In contrast, in the first and second embodiments shown in FIGS. 6 and 7, after review processing is conducted with respect to all of the target defects of review, composition analysis processing is conducted with respect to the defects of these serving as targets of composition analysis. Thus, the X-Y stage 7 is again moved with respect to each defect and positioning is conducted, and positioning thereof takes time.

With respect to this point, the third embodiment shown in FIG. 8 can further raise throughput in comparison to the embodiments shown in FIGS. 6 and 7. In contrast, the embodiments shown in FIGS. 6 and 7 can grasp the extent to which defects that are to serve as targets of composition analysis are present and implement composition analysis. In this point, they are more effective than the embodiment shown in FIG. 8. The user may decide which of the throughput and grasping the defect conditions is to be given priority.

Figure 9:
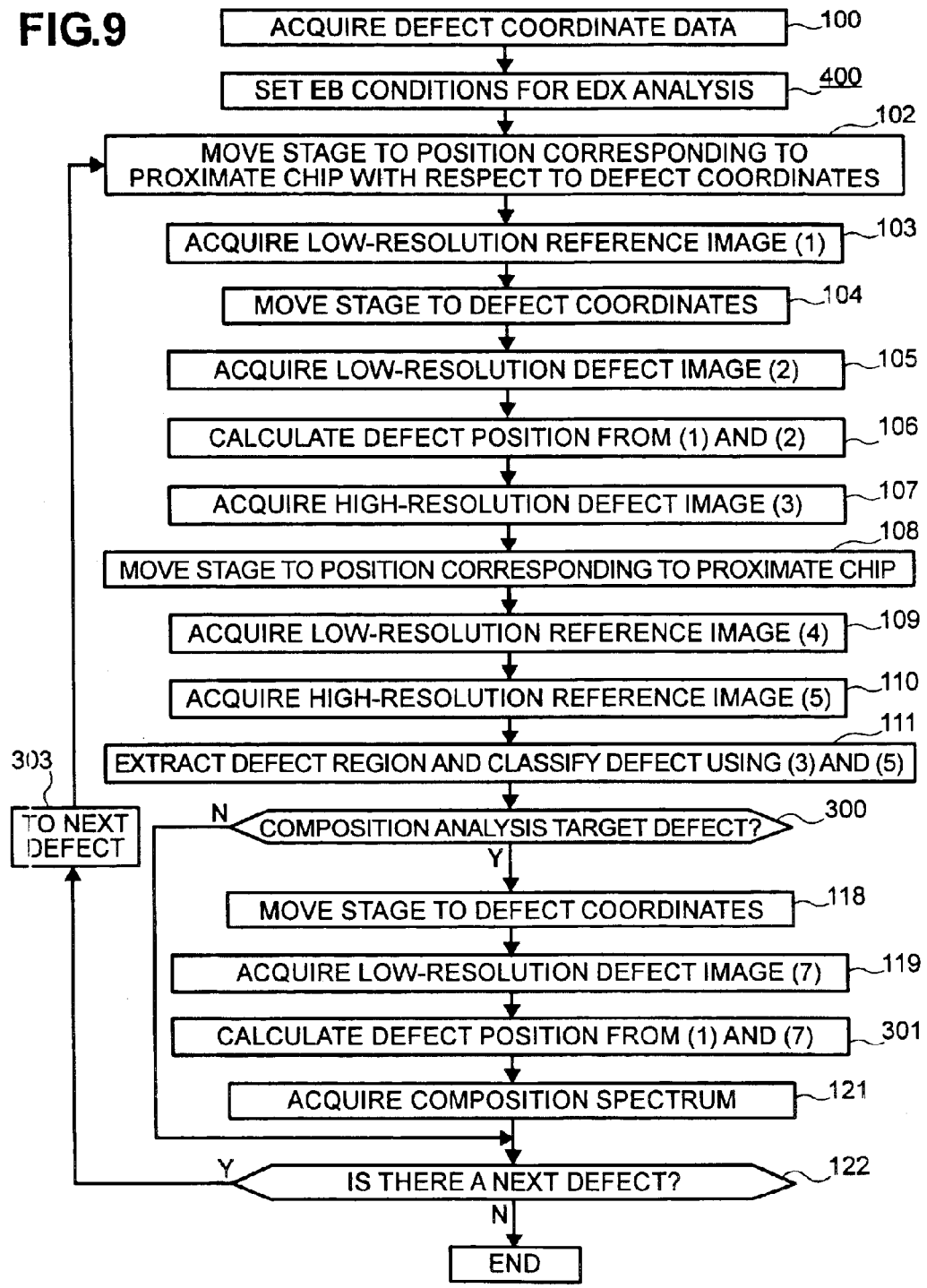
FIG. 9 is a flow chart showing a fourth embodiment of the method of analyzing the composition of defects according to the invention.

FIG. 9 is a flow chart showing a fourth embodiment of the method of analyzing the composition of defects according to the invention. The same reference numerals will be given to steps corresponding to those in FIG. 8 and overlapping description will be omitted. The fourth embodiment is also one where a semiconductor wafer WF including a pattern on the background is used as a target.

The fourth embodiment shown in FIG. 9 is basically the same as the embodiment shown in FIG. 8, except that the EB conditions are set for EDX analysis (step 400) after the defect coordinate data is acquired from the inspection device 18 (step 100). Thus, review processing of the defects (acquisition of reference images and defect images) is also conducted with the electron beam for EDX analysis. According to this, when the operation moves from the review processing operation to the composition analysis operation, it is not necessary to change the EB conditions from conditions for observation to conditions for EDX analysis (step 302), which was necessary in the third embodiment shown in FIG. 8.

Generally, when the EB conditions are changed, it takes a small amount of time until the output of the electron beam EB is stabilized. For example, when the acceleration voltage is changed, sometimes it takes several tens of seconds for the output of the electron beam EB to stabilize. In the fourth embodiment, because the time required for the stabilization of the electron beam EB accompanying the change in the EB conditions is spent at the time review processing is initiated, total amount of time becomes extremely short and high throughput can be realized. However, in the fourth embodiment, because the image acquisition for review is not conducted under EB conditions suited therefor, it is not always the case that an image of high quality that is easy to observe is obtained. The user may decide which of the throughput and the image quality is to be given priority.

Also, in the fourth embodiment shown in FIG. 9, a displacement vector may be used as in the second embodiment shown in FIG. 7. For example, in step 106 of FIG. 9, the displacement vector may be stored in the same manner as in step 200 of FIG. 7, and steps 118, 119 and 301 of FIG. 9 may be replaced with steps 201 and 202 of FIG. 7.

Here, with respect to the target chip, a spectrum of a portion with no defects corresponding to the defect portions thereof (referred to below as a reference spectrum) may be acquired, and this spectrum can be used as a determination standard when the composition of the defect is analyzed from the composition spectrum of the defect obtained in step 121 of FIGS. 6 to 9. An embodiment will be described below that enables the acquisition of this reference spectrum in each of the embodiments shown in FIGS. 6 to 9. Below, the portion with no defects will be described as a portion within the proximate chip.

Figure 10:
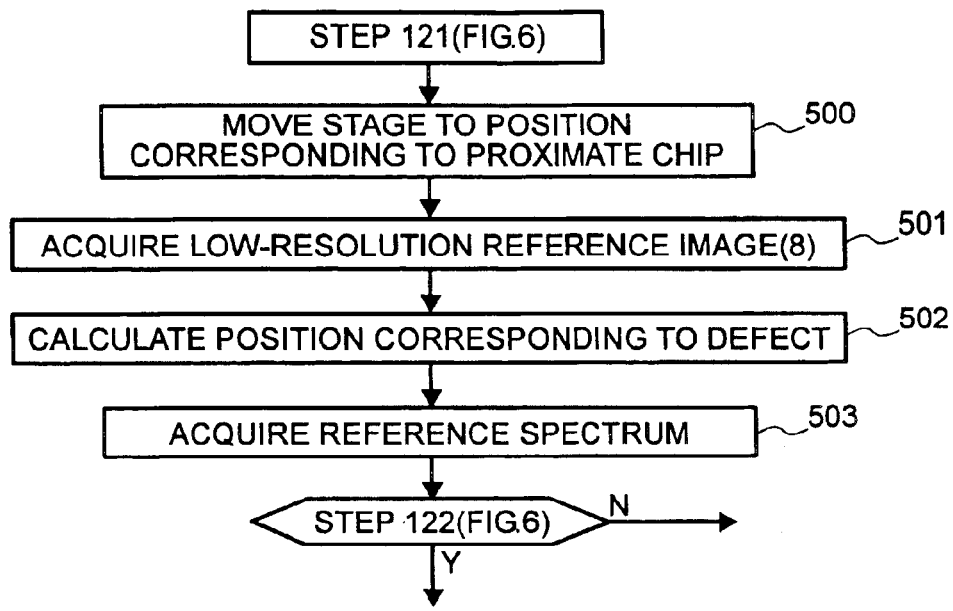
FIG. 10 is a flow chart showing a fifth embodiment of the method of analyzing the composition of defects according to the invention.

FIG. 10 is a flow chart showing a fifth embodiment of the method of analyzing the composition of defects according to the invention. As is illustrated, a processing operation (steps 500 to 503) for acquiring a reference composition spectrum is added between steps 121 and 122 in the first embodiment shown in FIG. 6, the composition spectrum of the target defect of composition analysis is acquired and, thereafter, the reference composition spectrum is acquired.

In FIG. 10, steps 500 and 501 are the same as steps 108 and 109 in FIG. 6. That is, the reason the field of view had been set to the target chip in step 118 of FIG. 6 was to ensure that the field of view corresponding to the defect was set to the proximate chip by moving the X-Y stage 7 (step 500). However, because the positioning error of the X-Y stage 7 is corrected at this time, an image of the low-resolution shooting field of view of the proximate chip, i.e., a low-resolution reference image (8), is acquired in the same manner as in step 109 of FIG. 6 (step 501), a template is created from the low-resolution reference image (6) of step 117 of FIG. 6, and template matching processing is conducted with this template and the low-resolution reference image (8), whereby the position of the proximate chip (referred to below as the defect corresponding position of the proximate chip) corresponding to the position of the target defect of composition analysis of the target chip (referred to below as the defect position of the target chip) is calculated (step 502). Then, the defect corresponding position of the proximate chip is used as the irradiation position of the electron beam EB for EDX analysis and the composition spectrum at this irradiation position, i.e., the reference composition spectrum, is acquired (step 503).

In this manner, the reference composition spectrum at the defect corresponding position of the proximate chip corresponding to the defect position of the target chip can be acquired, and the composition of the defect can be known by analyzing the defect composition spectrum acquired in step 121 of FIG. 6 on the basis of the reference composition spectrum.

Figure 11:
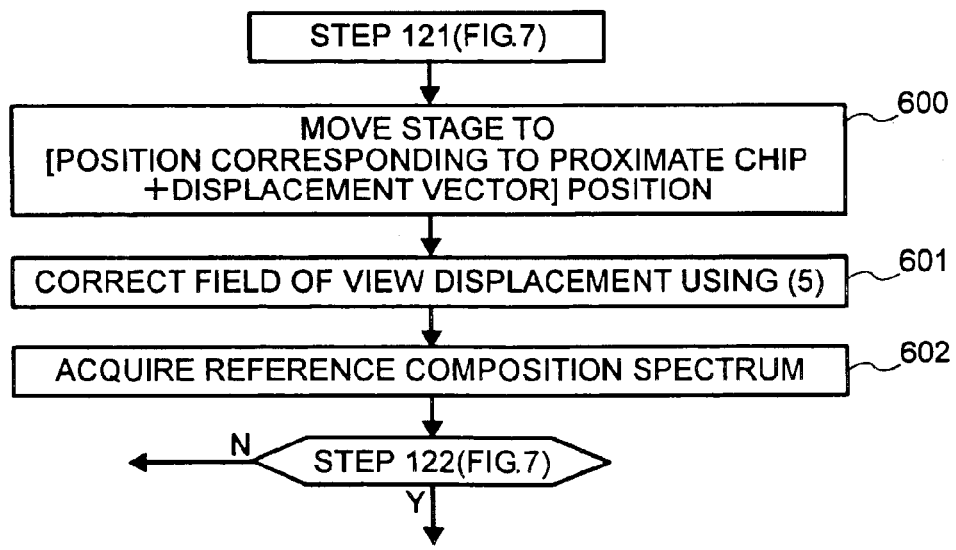
FIG. 11 is a flow chart showing main sections of a sixth embodiment of the method of analyzing the composition of defects according to the invention.

FIG. 11 is a flow chart showing a sixth embodiment of the method of analyzing the composition of defects according to the invention. As is illustrated, a processing operation (steps 600 to 602) for acquiring a reference composition spectrum is added between steps 121 and 122 in the second embodiment shown in FIG. 7, the composition spectrum of the defect is acquired and, thereafter, the reference composition spectrum is acquired.

In FIG. 11, after the composition spectrum of the target defect of composition analysis is acquired in step 121 of FIG. 7, the X-Y stage 7 is moved in the direction opposite from that of step 201 in FIG. 7, whereby the defect corresponding position of the proximate chip corresponding to the actual defect position of the target chip serves as the irradiation position of the electron beam EB on the basis of the defect corresponding position of the proximate chip corresponding to the defect position of the target chip determined in step 200 of FIG. 7 and the displacement vector similarly determined in step 200 (step 600), but in this case, because there is positioning error of the X-Y stage 7, this error is corrected in the same manner as in step 202 of FIG. 7 in order to correct this, and the defect corresponding position of the proximate chip precisely corresponding to the actual defect position on the target chip serves as the irradiation position of the electron beam EB (step 601). Then, the electron beam EB for EDX analysis is irradiated on the defect corresponding position, whereby the reference composition spectrum corresponding to the composition spectrum of the composition analysis defect acquired in step 121 of FIG. 6 is acquired (step 602).

In this manner, in the sixth embodiment also, the reference composition spectrum of the defect corresponding position of the proximate chip can be acquired.

FIG. 12 is a flow chart showing a seventh embodiment of the method of analyzing the composition of defects according to the invention. In the third embodiment of FIG. 8, steps 300 to 122 are replaced with the series of processing operations shown in FIG. 12, and the same reference numerals will be given to steps corresponding to those in FIG. 8.

In FIG. 12, first, the EB conditions are set to conditions for EDX analysis between steps 300 and 122 in order to acquire the reference composition spectrum and the defect composition spectrum (step 700). At this time, because the defect corresponding position of the proximate chip coincides with the irradiation position of the electron beam EB due to steps 108 and 109 of FIG. 8, the electron beam EB is irradiated onto the proximate chip, whereby the defect corresponding position is irradiated and reference composition spectrum data can be acquired. Processing hereafter is the same as the series of. processing operations of steps 118 to 121 in FIG. 8 excluding step 302.

In this manner, in the seventh embodiment also, the reference composition spectrum of the defect corresponding position of the proximate chip can be acquired.

FIG. 13 is a flow chart showing an eighth embodiment of the method of analyzing the composition of defects according to the invention. In the fourth embodiment of FIG. 9, a step 800 for acquiring the composition reference spectrum is added, and the same reference numerals will be given to steps corresponding to those in FIG. 9.

In FIG. 13, at the time it is determined that the review-processed defect is to serve as the target of composition analysis (step 300), because the EB conditions have already been set to conditions for EDX analysis due to the steps of FIG. 9 and the defect corresponding position of the proximate chip coincides with the irradiation position of the electron beam EB due to steps 108 and 109, the electron beam EB is irradiated on the defect corresponding position and the reference composition spectrum is acquired (step 800). Thereafter, the routine proceeds to step 118 of FIG. 9.

In this manner, in the eighth embodiment also, the reference composition spectrum of the defect corresponding position of the proximate chip can be acquired.

Here, in cases where the background pattern on the chip is linear wiring or there is no background pattern on the chip, a position including a similar pattern (or no pattern) near the target defect portion of composition analysis of the target chip may be used as the irradiation position of the electron beam EB to acquire the reference composition spectrum.

Figure 14B:
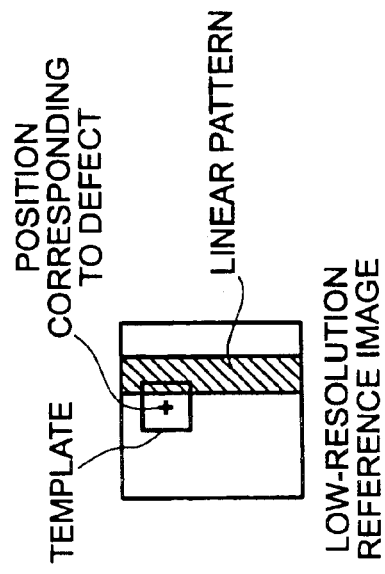
FIGS. 14A, 14B and 14C are a flow chart showing a specific example of a sequence of a method for acquiring a reference composition spectrum in the method of analyzing the composition of defects according to the invention.
Figure 14C:
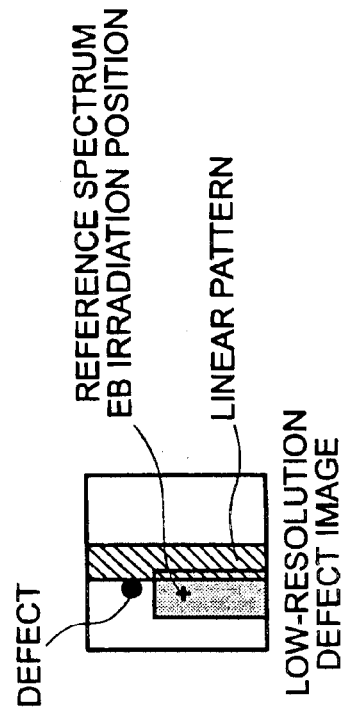
Figure 14A:
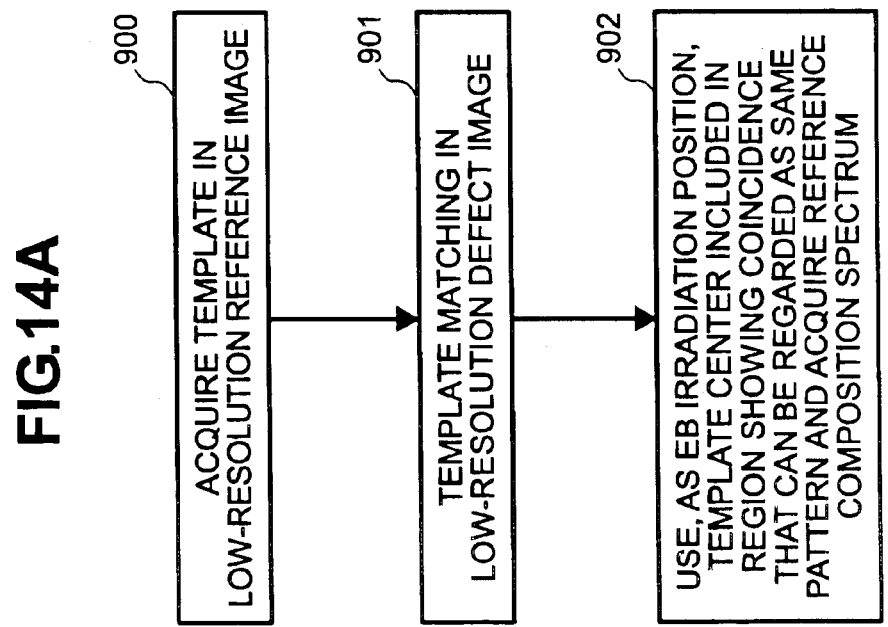

FIGS. 14A, 14B and 14C are a flow chart showing a specific example of the sequence of the method for acquiring the reference composition spectrum. This method is conducted using the low-resolution reference image and the low-resolution defect image, and can be used in place of the series of steps shown in FIGS. 10 to 13. Here, description will be given using the first embodiment shown in FIG. 6 as an example, but in this case, the low-resolution reference image (6) acquired in step 117 and the low-resolution defect image (7) can be used.

Now, the defect position of the target chip is in the vicinity of the linear background pattern. Thus, in the low-resolution defect image, as shown in FIG. 14C, the defect position is in the vicinity of the linear background pattern and, similarly, as shown in FIG. 14C, the defect corresponding position is in the vicinity of the linear background pattern. By "in the vicinity" is meant within the field of view of the low-resolution image.

Thus, in FIG. 14A, first, the position corresponding to the calculated defect position in the low-resolution image (FIG. 14B) is used as the center, and a template is created where the widening within the plane of the electron dispersion region (region where the electrons are dispersed in the chip) of the electron beam EB is used as the length of one edge (step 900). Next, in the low-resolution defect image (FIG. 14C), template matching is conducted with this template and a region of coincidence that can be regarded as the same pattern as the template is identified in this low-resolution defect image (step 901). Next, the center of the template included in this region is used as the irradiation position of the electron beam EB and the electron beam EB is irradiated on this to acquire the reference composition spectrum (step 902).

Also, even in a case where there is no background pattern, there will be no background pattern in the template, but, similar to the above, a region of coincidenc that can be regarded as the same as the template without the same background pattern as the template may be identified, and the center of the template included in this region may be used as the irradiation position of the electron beam EB to acquire the reference composition spectrum.

Although it is preferable for the region acquiring the reference composition spectrum on the target chip to be a region that is as close as possible to the target defect of composition analysis, it must not be affected by the target defect of composition analysis. Thus, an edge of the template is used as the electron diffusion region. The reason for this is to avoid part of the target defect of composition analysis from being included within the range of the electron diffusion region in which the irradiation position of the electron beam EB is centered and to avoid the composition data of the target defect of composition analysis from being included in the obtained reference composition spectrum.

That is, because the coincidence becomes small at the region where the target defect of composition analysis overlaps with the template when matching is conducted using the template with the low-resolution defect image, this region can be removed from the setting region of the irradiation position of the electron beam EB, whereby the region of the target defect of composition analysis is not included in the region where the electron beam EB is irradiated and the reference composition spectrum is obtained, and it is possible to guarantee that the obtained reference composition spectrum is not affected by the target defect of composition analysis.

The electron dispersion region using the length of the edge of the template may be calculated by Monte Carlo simulation in the corresponding EB conditions in regard to an element having the largest electron dispersion of the film composition near the surface of the chip formed by the corresponding steps or an element having the largest electron dispersion of elements used in regard to a target product.

Which of the acquisition method of the reference composition spectrum described in FIGS. 10 to 13 and the acquisition method of the reference composition spectrum described in FIGS. 14A to 14C is used may be designated in advance. These may be selectively used according to conditions so that, when the method shown in FIG. 14 is used, the method shown in FIGS. 14A to 14C is used if there is a region having a high coincidence with the template and the method described in FIGS. 10 to 13 is used if there is no such region, and the method for acquiring the reference composition spectrum with the defect corresponding position of the proximate chip is implemented.

Although FIG. 14 was explained using th first embodiment shown in FIG. 6 as an example, it goes without saying that it is also possible to apply the embodiments of FIGS. 7 to 9. For example, in the second embodiment shown in FIG. 7, the low-resolution defect image may be acquired between steps 121 and 122 and the already acquired low-resolution image (1) or (4) may be used for the low-resolution reference image. Also, in the third and fourth embodiments shown in FIGS. 8 and 9, the low-resolution reference image (4) acquired in step 109 and the low-resolution defect image (7) acquired in step 119 may be used.

In the above embodiments, there was a background pattern on the semiconductor wafer and this was used to detect the region and position of the defect. However, next, an embodiment of a method of analyzing the composition of defects in a case where there is no background pattern on the semiconductor wafer will be described.

Figure 15:
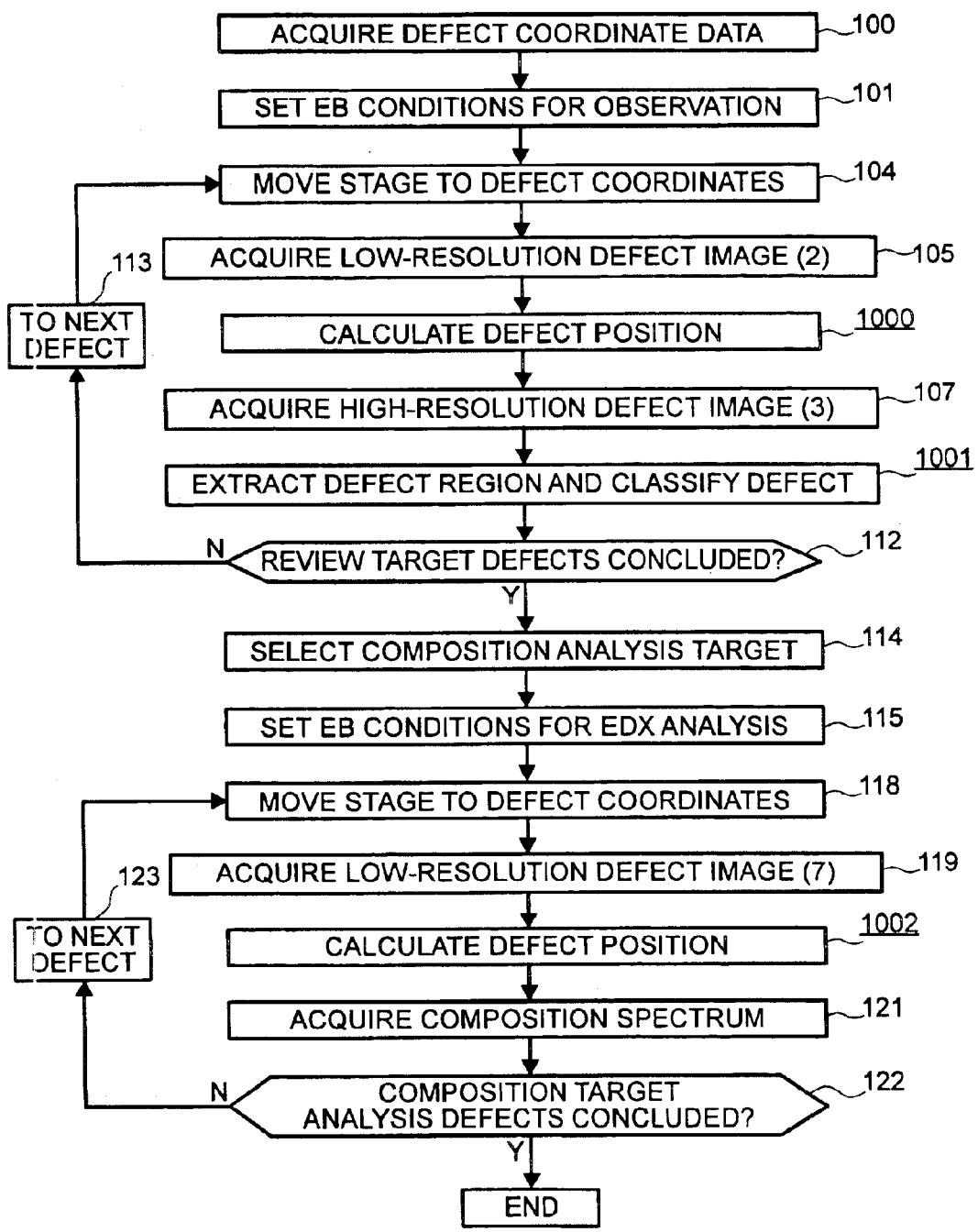
FIG. 15 is a flow chart showing main sections of a ninth embodiment of the method of analyzing the composition of defects according to the invention.

FIG. 15 is a flow chart showing a ninth embodiment of the method of analyzing the composition of defects according to the invention in a case where there is no background pattern on the semiconductor wafer and corresponds to the first embodiment shown in FIG. 6. The same reference numerals will be given to steps corresponding to those in FIG. 6 and overlapping description will be omitted.

Because the background is the same with respect to whichever defect when there is no pattern in the background, it is not necessary to acquire a reference image for each target defect of composition analysis. Thus, the ninth embodiment excludes the st p for acquiring the reference image in the first embodiment shown in FIG. 6.

That is, in FIG. 15, first, in the review processing operation, when the defect coordinate data of the inspection device 18 is acquired (step 100) and the EB conditions are set to conditions for observation (step 101), the X-Y stage 7 is moved to be able to obtain the defect image (step 104), the low-resolution defect image is acquired (step 105), the defect position of the target chip is calculated from this low-resolution defect image (step 1000), a high-resolution defect image is acquired on the basis of this defect position (step 107), and region extraction of the target defect of review and classification of the defect are conducted (step 1001). In this manner, steps 102, 103 and 108 to 110 of FIG. 6 for acquiring the reference image are omitted.

Here, with respect to the calculation of the defect position from the low-resolution defect image in step 1000, the target defect of review is detected from a difference in luminance or the like in the image and this position is calculated. As one method for detecting the target defect of review, the low-resolution defect image is differentiated and compared with a preset threshold, and a portion where the differentiation value is greater than that of the threshold is extracted as an outline of the defect region. Alternatively, a portion in the field of view where the defect is not present may be acquired in advance as a reference image, and the difference between this reference image and the defect image may be detected. The extraction of the defect region from the high-resolution defect image in step 1001 also similarly uses a difference in luminance or the like in the image.

In the composition analysis operation, when the EB conditions are set to conditions for EDX analysis. (step 115) with respect to the selected target defect of composition analysis (step 114), the X-Y stage 7 is moved to be able to acquire the defect image (step 118), the low-resolution defect image is acquired (step 119), the defect position is calculated from this low-resolution defect image (step 1002), this defect position is used as the electron beam irradiation position, and the composition spectrum of this target defect of composition analysis is acquired (step 121). In this manner, steps 116 and 117 of FIG. 6 for acquiring the reference image are omitted.

Here, the method for calculating the defect position from the low-resolution defect image in step 1002 is the same as the above-described method using a difference in luminance.

Figure 16:
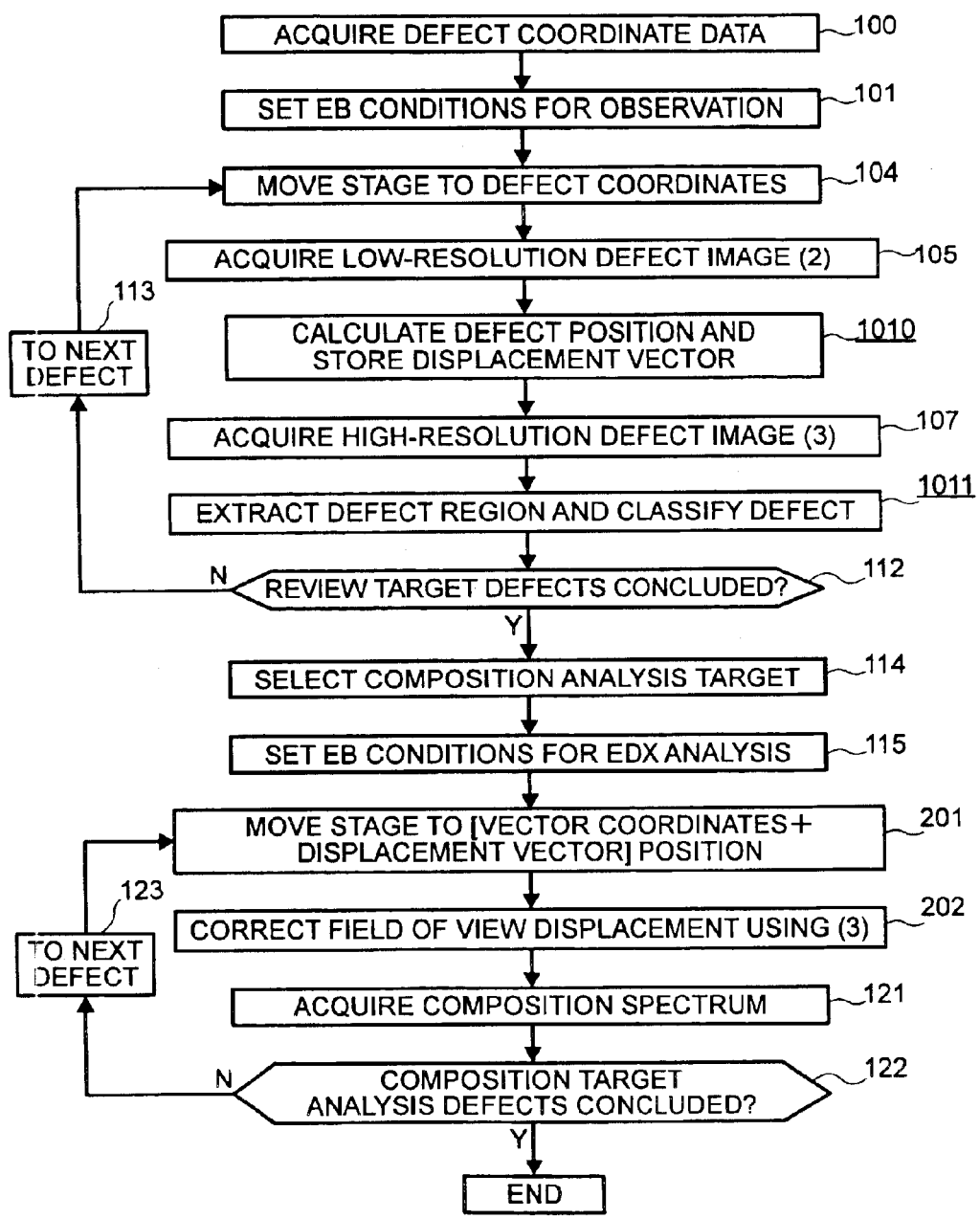
FIG. 16 is a flow chart showing main sections of a tenth embodiment of the method of analyzing the composition of defects according to the invention.

FIG. 16 is a flow chart showing a tenth embodiment of the method of analyzing the composition of defects according to the invention in a case where there is no background pattern on the semiconductor wafer and corresponds to the second embodiment shown in FIG. 7. The same reference numerals will be given to steps corresponding to those in FIG. 7 and overlapping description will be omitted.

The tenth embodiment shown in FIG. 16 excludes the series of processing operations resulting from steps 102, 103 and 108 to 110 for acquiring the reference image of the second embodiment shown in FIG. 7. However, in a case where the defect position is calculated from the low-resolution defect image acquired in step 105 (step 1010), or in a case where the defect region is extracted from the high-resolution defect image acquired in step 107 (step 1011), the defect is detected using a difference in luminance in the low-resolution defect image and the high-resolution defect image similar to steps 1000 and 1001 in FIG. 15.

Figure 17:
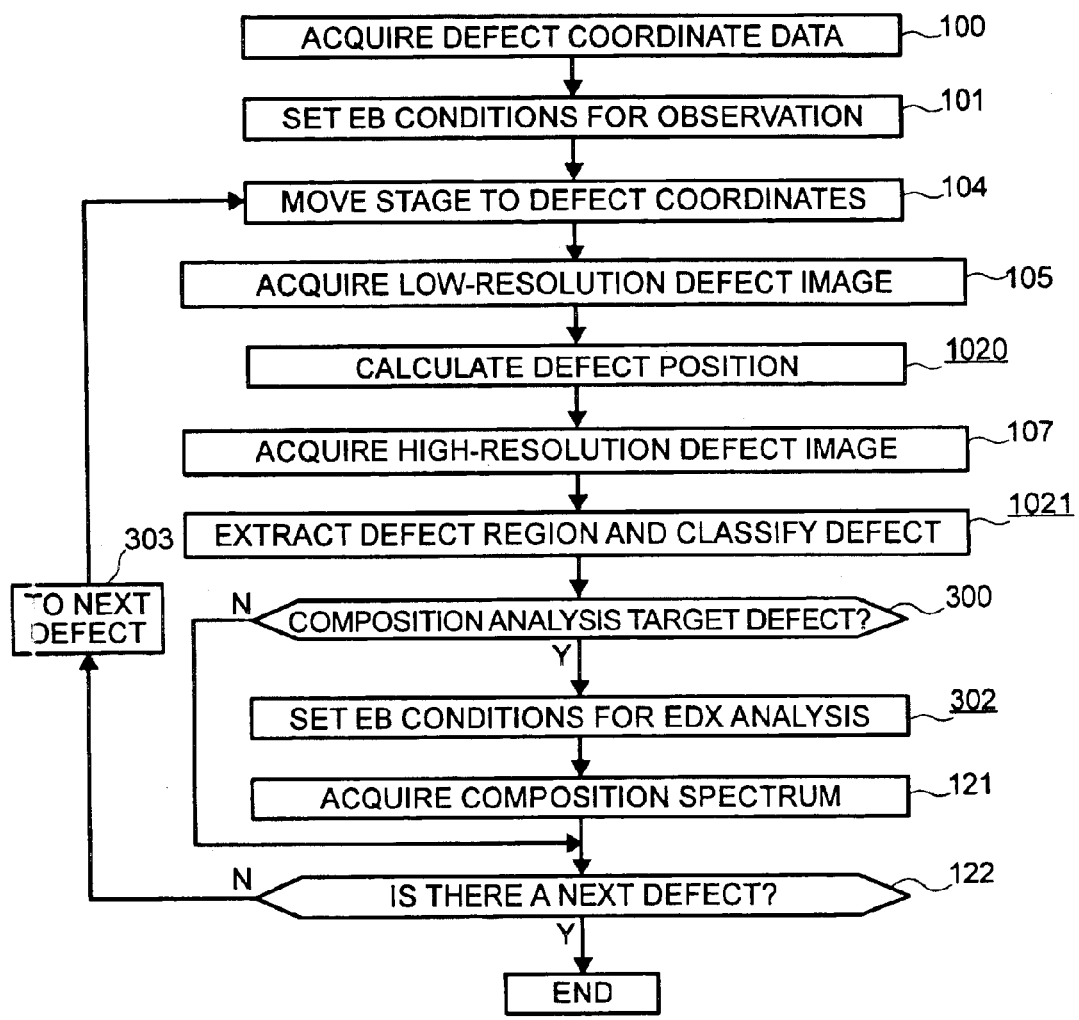
FIG. 17 is a flow chart showing main sections of an eleventh embodiment of the method of analyzing the composition of defects according to the invention.

FIG. 17 is a flow chart showing an eleventh embodiment of the method of analyzing the composition of defects according to the invention in a case where there is no background pattern on the semiconductor wafer and corresponds to the third embodiment shown in FIG. 8. The same reference numerals will be given to steps corresponding to those in FIG. 8 and overlapping description will be omitted.

The eleventh embodiment shown in FIG. 17 excludes the series of processing operations resulting from steps 102, 103 and 108 to 110 for acquiring the reference image of the third embodiment shown in FIG. 8. However, in a case where the defect position is calculated from the low-resolution defect image acquired in step 105 (step 1020), or in a case where the defect region is extracted from the high-resolution defect image acquired in step 107 (step 1021), the defect is detected using a difference in luminance in the low-resolution defect image and the high-resolution defect image similar to steps 1000 and 1001 in FIG. 15.

Also, with respect to the composition analysis operation, steps 118, 119 and 301 in FIG. 8 are excluded. The reason for this is, because steps 108 to 110 for acquiring the high-resolution reference image are excluded in the review operation, when review processing ends and composition analysis processing is started thereafter with respect to the target defect of composition analysis, the X-Y stage 7 is as was moved to the defect coordinates in step 104 at the time of the review operation and the position of the target defect of composition analysis is calculated in step 1020. In step 121, the irradiation position of the electron beam EB is matched to the defect position.

Figure 18:
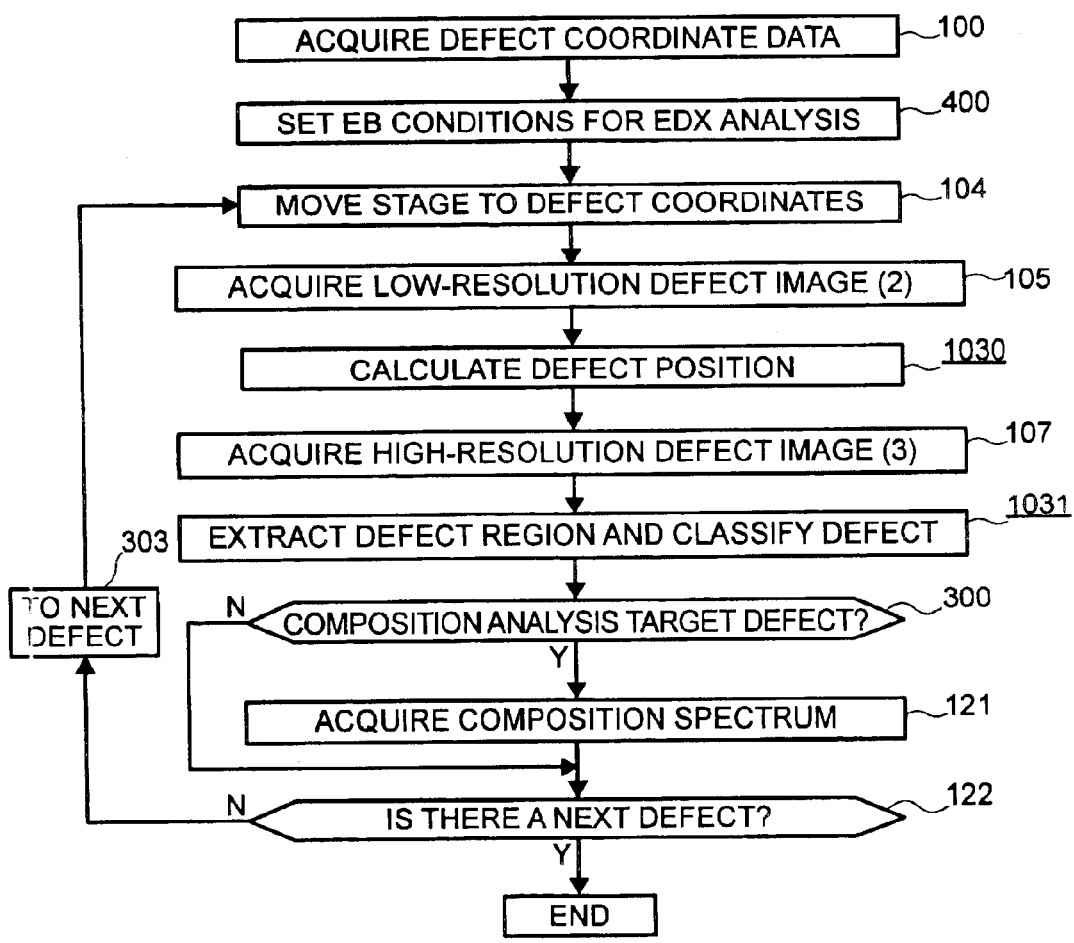
FIG. 18 is a flow chart showing main sections of a twelfth embodiment of the method of analyzing the composition of defects according to the invention.

FIG. 18 is a flow chart showing a twelfth embodiment of the method of analyzing the composition of defects according to the invention in a case where there is no background pattern on the semiconductor wafer and corresponds to the fourth embodiment shown in FIG. 9. The same reference numerals will be given to steps corresponding to those in FIG. 9 and overlapping description will be omitted.

The twelfth embodiment shown in FIG. 18 excludes the series of processing operations resulting from steps 102, 103 and 108 to 110 for acquiring the reference image of the fourth embodiment shown in FIG. 9. However, in a case where the defect position is calculated from the low-resolution defect image acquired in step 105 (step 1030), or in a case where the defect region is extracted from the high-resolution defect image acquired instep 107 (step 1031), the defect is detected using a difference in luminance in the low-resolution defect image and the high-resolution defect image similar to steps 1000 and 1001 in FIG. 15.

Also, because the composition analysis operation is the same as that of the eleventh embodiment shown in FIG. 17, steps 118, 119 and 301 of FIG. 9 are excluded, and because the EB conditions are already set for EDX analysis in step 400 of the review operation, the irradiation position of the electron beam EB is matched to the defect position on the basis of the defect position calculated in step 1030, and thereafter acquisition of the composition spectrum of this defect is conducted (step 121).

Incidentally, in the above-described first to twelfth embodiments, the defect position was calculated at the time of the composition analysis operation from the low-resolution reference image and the low-resolution defect image or the low-resolution defect image and the irradiation position of the electron beam was controlled to coincide with this defect position. However, when the defect position is calculated using a low-resolution image in this manner, quantization error is included in the position coordinate values and sometimes the irradiation position of the electron beam cannot be precisely matched to the defect position of the target chip.

Here, quantization error will be simply described.

An image is a collection of pixels, and the same is true of the low-resolution defect image. The region of the defect appearing in the low-resolution defect image is also a collection of pixels. Each pixel has an area of a certain extent, and when the defect region overlaps even slightly with this pixel region, this pixel becomes included in the defect region. In a case of a defect having a large region, the actual defect region overlaps part of the pixel, and even if this pixel becomes included inside this defect region, it is slight with respect to the actual defect region. Thus, it does not become a remarkable problem in detection of the defect position.

In contrast, in a case where the actual defect region is small, e.g., in the case of a defect of a region of the size of about one pixel, even if the actual region of the defect is slight, when it overlaps an adjacent pixel, this adjacent pixel also becomes included in the region of this defect, and a defect region that appears to be largely different from the actual defect region arises. When the defect position is calculated from a defect region appearing this way, it ends up being largely different from the defect position calculated from the actual defect region. This is quantization error in the coordinate values.

With respect to a defect image of the same resolution, the amount of quantization error is itself determined by the pixel number configuring the overall defect image, so it may be considered to be constant regardless of the size of the defect. Thus, the smaller the defect, the easier calculation is affected by quantization error. Because the low-resolution defect image is obtained by shooting a wide range with the same pixel number, the defect is photographed small, calculation is easily affected by quantization error, and it becomes impossible to ignore that affect.

Next, using the first embodiment shown in FIG. 6 as an example, a method of reducing the affect of quantization error and setting the irradiation position of the electron beam EB will be described as a thirteenth embodiment.

Figure 19:
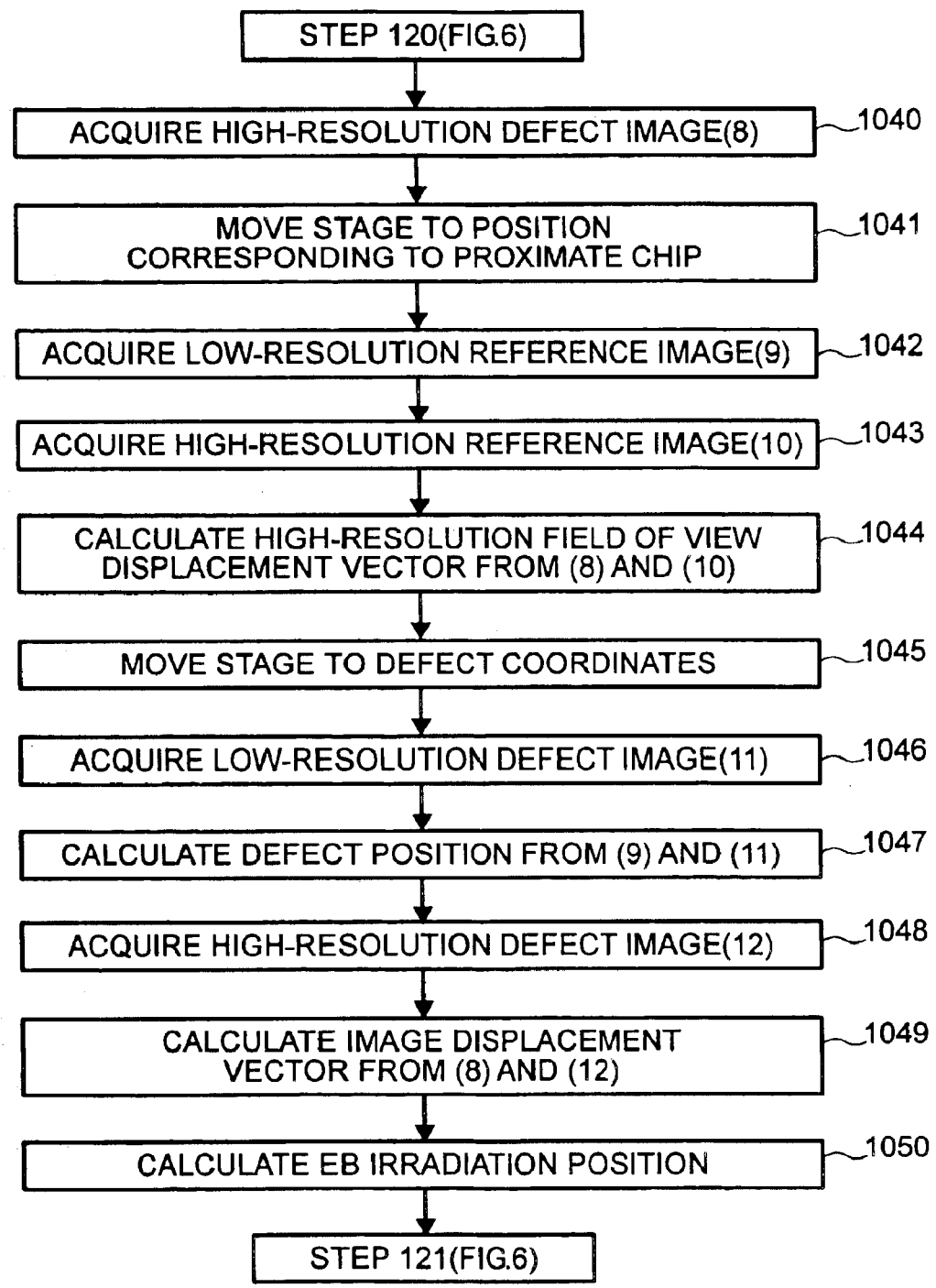
FIG. 19 is a flow chart showing main sections of a thirteenth embodiment of the method of analyzing the composition of defects according to the invention.

FIG. 19 is a flow chart showing a thirteenth embodiment of the method of analyzing the composition of defects according to the invention, and is one where a series of operations resulting from illustrated steps 1040 to 1050 are conducted between steps 120 and 121 of the first embodiment shown in FIG. 6 and the irradiation position of the electron beam EB is set on the basis of the high-resolution defect image.

Figure 20:
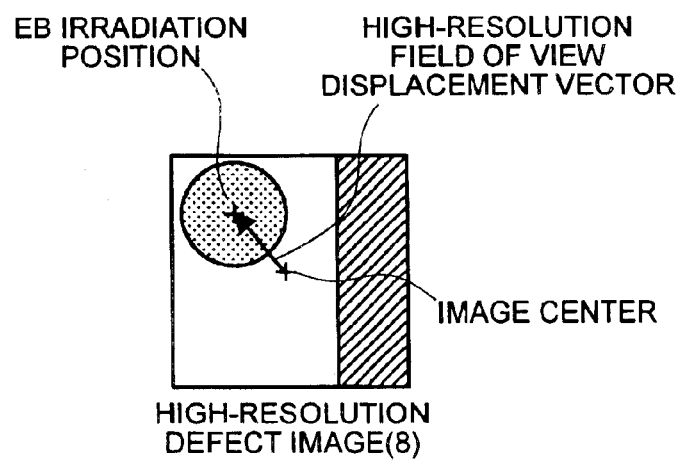
FIG. 20 is an explanatory diagram of a magnified view displacement vector in the embodiment shown in FIG. 19.

In FIG. 19, a high-resolution shooting field of view is shot on the target chip on the basis of the defect position calculated from the low-resolution defect image in the same manner as in step 107 of FIG. 6 to acquire the high-resolution defect image (8) (step 1040). Next, the X-Y stage 7 is moved to the proximate chip and a low-resolution reference image (9) is acquired in the same manner as in steps 108 to 110 as shown in FIG. 6 (steps 1041 and 1042). Then, a high-resolution reference image (10) is acquired on the basis of the low-resolution reference image (9) (step 1043). Then, positioning processing and difference extraction processing of the high-resolution defect image (8) and the high-resolution reference image (10) are conducted, the region of the target defect of composition analysis is calculated, the irradiation position of the electron beam EB within this defect region is determined and, as shown in FIG. 20, a vector to the irradiation position of the electron beam EB within this defect region with respect to the image center of the high-resolution defect image (8) (referred to below as a high-resolution field of view displacement vector) is acquired (step 1044).

In this manner, the irradiation position of the electron beam EB is determined. However, next, in order to irradiate the electron beam EB on this irradiation position, i.e., the defect position, and conduct composition analysis, the X-Y stage 7 is moved and returned to the state when the high-resolution defect image (8) of step 1040 was acquired (step 1045), but it cannot be precisely returned to its original state (i., the state of step 1040) due to positioning error of the X-Y stage 7. Thus, similar to steps 105 to 107 in FIG. 6, a low-resolution defect image (11) is acquired (step 1046), the defect position is calculated from this low-resolution defect image (11) and the low-resolution reference image (9) acquired in step 1042 (step 1047), a high-resolution defect image (12) is acquired on the basis of this defect position, the high-resolution defect image (12) and the high-resolution defect image (8) acquired in step 1040 are matched, and the image center of the high-resolution defect image (12) is used as an origin to calculate a vector to the image center of the high-resolution defect image (8) (referred to below as an image displacement vector) mapped on this.

As a result of the above processing, the defect position of the high-resolution defect image (12) becomes a position represented by the sum vector of the high-resolution field of view vector using the image center of the high-resolution defect image (12) as an origin and the image displacement vector. Then, this position is determined to be the irradiation position of the electron beam EB (step 1050), the electron beam EB is irradiated, and the composition vector of the target defect of composition analysis is acquired (step 121 of FIG. 6).

As a modified example of the thirteenth embodiment shown in FIG. 19, a displacement vector may be used as in the second embodiment shown in FIG. 7. For example, in step 120 of FIG. 6 shown in FIG. 19, a displacement vector may be stored in the same manner as in step 200 of FIG. 7 and steps 1045 to 1047 of FIG. 19 may be replaced with step 201 of FIG. 7.

As a modified example of the thirteenth embodiment shown in FIG. 19, another example of a method for reduced the affect of quantization error and setting the irradiation position of the electron beam EB will be described using FIG. 6 as an example. This is an example where the order in which the defect image and the reference image are obtained is switched with the sequence according to FIG. 19.

That is, the X-Y stage 7 is moved to the defect coordinates at the stage corresponding to step 116 in FIG. 6. In the next step, the low-resolution defect image (7) is acquired. Next, the X-Y stage 7 is moved to the proximate chip corresponding position with respect to the defect coordinates and the low-resolution reference image (6) is acquired. Next, the position with respect to defect presence position in the low-resolution reference image (6) is calculated from the images (6) and (7) and the high-resolution reference image (10) having this position as the center is acquired. Next, the X-Y stage 7 is moved to the defect coordinates and the low-resolution defect image (11) is acquired. Then, the defect position is calculated using the low-resolution defect image (11) and the low-resolution reference image (6) to acquired the high-resolution defect image (12). Th region of the defect of the high-resolution defect image obtained here is not limited to being within the field of view due to the affect of quantization error. Thus, the defect region is identified with the high-resolution defect image (12) and the high-resolution reference image (10), and the EB irradiation position is set within this defect region. Then, the electron beam EB is irradiated on this EB irradiation position and the composition spectrum of the composition analysis target defect is acquired.

In this manner, affects resulting from quantization error can be eliminated even with regard to defects of a small size, and the electron beam EB for EDX analysis can be irradiated on the defect with high precision.

The thirteenth embodiment is also applicable to the third and seventh embodiments shown in FIGS. 8 and 12 and to the fourth and eighth embodiments shown in FIGS. 9 and 13.

With respect to the second embodiment shown in FIG. 7 or the sixth embodiment shown in FIG. 11, in step 111, a high-resolution field of view displacement vector may be obtained from the high-resolution defect image (3) and the high-resolution reference image (5) as in step 1044 of FIG. 19, positioning of the X-Y stage 7 may be effected in step 201, and thereafter a position where the high-resolution shooting field of view displacement vector is added to the image center at this time may be used as the electron beam EB irradiation position in step 202. The same is true of the sixth embodiment shown in FIG. 11.

With respect to the ninth to twelfth embodiments in a case where there is no pattern in the background shown in FIGS. 15 to 18, the defect region may be perceived as described above from the high-resolution defect image, the defect position may be calculated from this defect region, a high-resolution field of view displacement vector from the image center of the high-resolution defect image to the defect position may be determined, and a position where the high-resolution field of view displacement vector is added to the image center may be used as the electron beam EB irradiation position. The high-resolution defect image may be acquired in FIG. 15 on the basis of the defect position calculated in step 1002, may be acquired in FIG. 16 after step 202, and the high-resolution defect image acquired in step 107 may be used as the high-resolution defect image in FIGS. 17 and 18.

Here, the identification of the irradiation position of the electron beam EB from the high-resolution defect image can be realized by binarizing the absolute value of the difference image, detecting the defect region, and calculating the weighted center point of the detected defect region. However, the calculation of the irradiation position of the electron beam EB is not limited only to this method. Another method may also be used as long as it is a method where the irradiation position of the electron beam EB is calculated within the defect region.

Figure 21A:
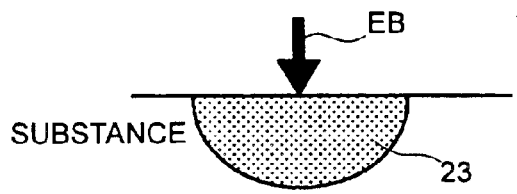
FIGS. 21A and 21B are diagrams showing differences in physical phenomena resulting from irradiation conditions of an electron beam.
Figure 21B:
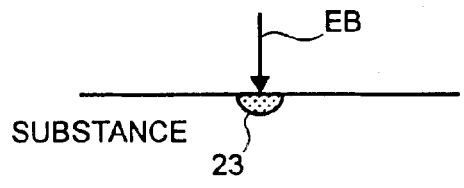

At the time the defect composition spectrum is acquired using the electron beam whose EB conditions have been set for EDX analysis, the range in which information of included elements can be obtained (i.e., the range in which X-rays can be obtained by irradiation of the electron beam: electron dispersion range) differs, as shown in FIGS. 21A and 21B, depending on the acceleration voltage of the electron beam (i.e., when the acceleration voltage is high, an electron dispersion range 23 becomes wide and deep (FIG. 21A), and when the acceleration voltage is low, the electron dispersion range 23 becomes shallow and narrow (FIG. 21B)), and the spatial resolution of the obtained in formation differs. Although the spatial resolution is improved when the acceleration voltage is reduced, the irradiated energy becomes small. Thus, elements for which a high energy is required in order to analyze them become undetectable and the number of elements whose composition can be analyzed becomes limited.

In a case where the defect is small or a case where the height of the defect is low, it is preferable to analyze elements under EB conditions where spatial resolution is given priority because elements that become particles become undetectable when the spatial resolution is poor. In a case where the defect is large or a case where the height of the defect is high, it is preferable to analyze elements under EB conditions where detectable element number is given priority over spatial resolution because element detection can be conducted even if the spatial resolution is poor.

Figure 22:
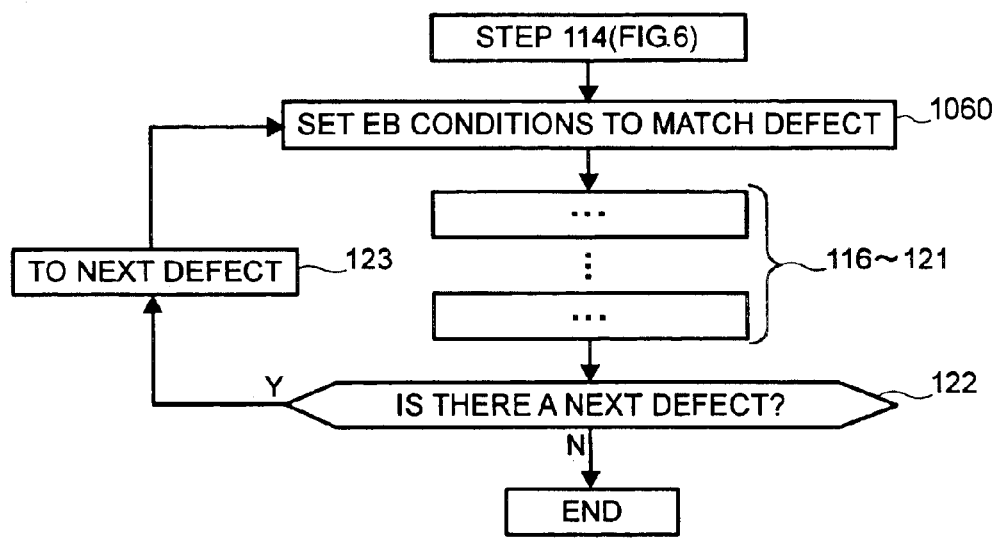
FIG. 22 is a flow chart showing main sections of a fourteenth embodiment of the method of analyzing the composition of defects according to the invention.

Thus, in the case of the first embodiment shown in FIG. 6 and the embodiments of FIGS. 10 and 15 where the first embodiment is modified, and in a case where the EB conditions are varied in accordance with the target defect of composition analysis in this manner, as shown in FIG. 22 as a fourteenth embodiment, step 115 in FIG. 6 may be replaced with step 1060 where the EB conditions are set to match the target defect of composition analysis.

Figure 23:
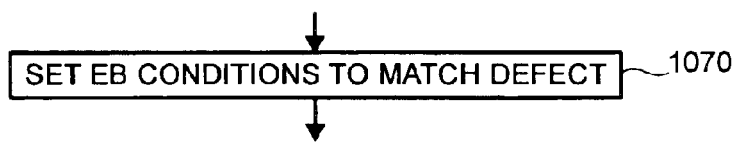
FIG. 23 is a flow chart showing main sections of a fifteenth embodiment of the method of analyzing the composition of defects according to the invention.

Also, in the second embodiment shown in FIG. 7 and the embodiments of FIGS. 11 and 16 where the second embodiment is modified, step 115 may be replaced with step 1070 shown in FIG. 23. In the third embodiment shown in FIG. 8 and the embodiments of FIGS. 12 and 17 where the third embodiment is modified, step 302 may be replaced with step 1070 shown in FIG. 23. In the fourth embodiment shown in FIG. 9 and the embodiments of FIGS. 13 and 18 where the fourth embodiment is modified, step 400 may be replaced with step 1070 shown in FIG. 23. This may serve as a fifteenth embodiment of the method of analyzing the composition of defects according to the invention. The same is true of the thirteenth embodiment shown in FIG. 19.

Here, in step 1060 in FIG. 22 and step 1070 in FIG. 23, the irradiation conditions of the electron beam EB (i.e., EB conditions) at the time of composition analysis are set in accordance with characteristics of the defect, such as the height and area of the target defect of composition analysis, and the defect classification result. In this case, sometimes the field of view shifts in accompaniment with changes in the EB conditions, and in this case, processing for correcting the irradiation position of the electron beam EB using the aforementioned methods may be added.

Also, here, the irradiation frequency of the electron beam EB may be added to the EB conditions, and the same defect may be irradiated multiple times with electron beams EB having different acceleration voltages to acquire spectrum data. In this case, with respect to a defect determined to be "embedded", it is conceivable for the composition spectrum of the film to be included in the obtained composition spectrum. However, using the aforementioned method, for example, taking the difference between a spectrum obtained under a condition in which the acceleration voltage of the electron beam EB is high and a spectrum obtained under a condition in which the acceleration voltage of the electron beam EB is low, it can be judged that the potential for an element whose signal intensity is larger in the latter than in the former to be an element included in the defect is high.

As for the setting method of the EB conditions, in a case where characteristics taking continuous values such as the area and height of the target defect of composition analysis are used as a condition changing standard, EB conditions corresponding to those characteristics may be set, as shown in FIGS. 24A and 24B. FIG. 24A shows an example where the relation between the characteristics and the EB conditions is expressed as a continuous function, and FIG. 24B shows an example where the characteristics are grouped into predetermined ranges and constant EB conditions that are mutually different per group are taken. Here, an example is shown where defect height is used as the characteristics of the target defect of composition analysis and the acceleration voltage of the electron beam is used as the EB condition. However, the combination of the characteristic of the target defect of composition analysis and the EB condition is not limited to this.

When the EB conditions are changed by non-continuous characteristics, such as the classification result of the target defect of composition analysis or the determination of "on the surface" or "embedded", a table may be created where the EB conditions are made to correspond to the respective characteristics of the target defect of composition analysis.

FIG. 25 is a diagram showing a specific example of a GUI (Graphical User Interface) for setting these conditions. 24 is a condition setting screen, 25 is a defect characteristic selection list for selecting characteristics of the target defect of composition analysis serving as the target for condition setting, and 26 is an input box of EB conditions with respect to the characteristic selected in the list 25.

In FIG. 25, the defect characteristic selection list 25, in which characteristics such as the classification result obtained by the review processing in each of the preceding embodiments and the size and height of the defect are selectably arranged as characteristics of the target defect of composition analysis, is displayed in the EB condition setting screen 24. When a predetermined characteristic (e.g., "height") is selected from the defect characteristic selection list 25, the input box 26 of the EB irradiation conditions relating to the "height" characteristic is displayed.

In the input box 26, the target defect of composition analysis can be designated by registering the height thereof, and the acceleration voltage of the electron beam EB irradiated in this case, the probe current and the elapse time of irradiation can also be designated. When input of each heading is conducted and registered in the input box 26, the EB conditions corresponding to the height of the target defect of composition analysis are set (i.e., step 1060 in FIG. 22 and (step) 1070 in FIG. 23), and when a cancel operation is conducted in the input box 26, the input headings are canceled in the reverse order of the input order. Thus, correction of the input headings becomes possible.

Also, in a case where the surface film of the chip is optically transparent, the depth within the surface film where the target defect of composition analysis is present may be used as a characteristic to determine the EB conditions. With respect to this numerical value, for example, as shown in FIG. 26, a depth position where a focal point matches a target defect 27 of composition analysis noted within a surface film 28 with an optical microscope is searched, and a depth d as far as the position of the target defect 27 of composition analysis is determined. As shown in FIGS. 27A and 27B, by determining the acceleration voltage of the electron beam EB in accordance with this depth d, the information of the defect can be reliably obtained. Here, FIG. 27A shows a case where the depth d as far as the position of the target defect 27 of composition analysis is shallow. In this case, the acceleration voltage of the electron beam EB is lowered and an electron dispersion region 23 is made shallow. In a case where the depth d as far as the position of the target defect 27 of composition analysis is deep, as shown in FIG. 27B, the acceleration voltage of the electron beam EB is raised and the electron dispersion region 23 is made deep.

Figure 28A:
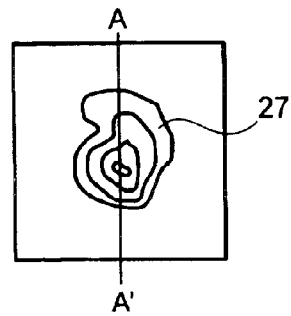
FIGS. 28A and 28B are diagrams describing irradiation positions of an electron beam on defects whose heights are uneven.
Figure 28B:
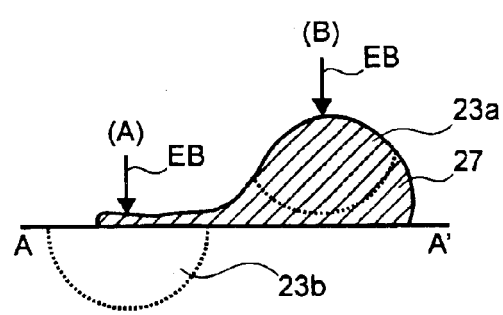

At the time of composition analysis of the defect, the larger the region in which information relating to elements configuring the target defect of composition analysis can be obtained is, i.e., the larger the volume of the portion of the target defect of composition analysis included in the electron dispersion region is, information of elements included in the defect can be detected with high sensitivity. FIGS. 28A and 28B are diagrams showing an example of the target defect of composition analysis. FIG. 28A is a top view and FIG. 28B is a longitudinal cross-sectional view along a sectional line A–A' of FIG. 28A. In this example, a defect where the height is uneven is shown.

With respect to the target defect 27 of composition analysis, as shown in FIG. 28B, in a case where the EB conditions are the same, as shown by (A), when the electron beam EB is irradiated on the low region of the height of the target defect 27 of composition analysis, a portion outside the portion of the target defect 27 of composition analysis becomes included in an electron dispersion region 23b, and a spectrum resulting from this portion also becomes included in the detected composition spectrum. With respect to this, as shown in (B), in a case where the electron beam EB is irradiated on the portion where the height of the target defect 27 of composition analysis is high, only the portion of the defect 27 is included in an electron dispersion region 23a, and a composition spectrum resulting from only the target defect 27 of composition analysis is obtained. Thus, with respect to the defect 27 that is uneven in this manner, it is more preferable to irradiate the electron beam EB on the high portion of the target defect 27 of composition analysis shown by (B) than to irradiate the electron beam EB on the low portion of the target defect 27 of composition analysis shown by (A).

Thus, in the high-resolution defect image, the three-dimensional shape of the target defect of composition analysis is calculated and the vicinity of the highest point thereof is used as the irradiation position of the electron beam EB. For this purpose, for example, at the time of the calculation of the high-resolution field of view displacement vector in step 1044 of FIG. 19 shown in FIG. 20, the position within the region of the target defect of composition analysis is used as the vicinity of the highest point and the high-resolution field of view displacement vector is determined with respect to this position. Thus, in the electron dispersion region, the volumetric ratio that the region of the core of the target defect 27 of composition analysis occupies increases and detection sensitivity of elements included in this core can be improved.

Figure 29A:
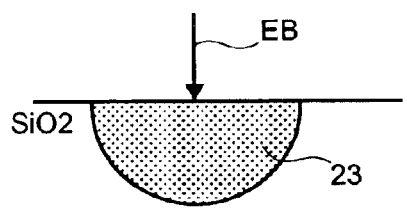
FIGS. 29B and 29B are diagrams for describing differences in irradiation conditions of an electron beam with respect to elements.
Figure 29B:
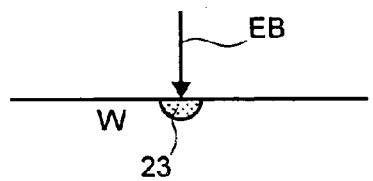

In a case where the target defect of composition analysis is generated during a thin film deposition process, the surface of the defect becomes covered by elements configuring the thin film. Even in such as case as this, because the irradiated electrons are dispersed in the thin film, it is possible to detect information relating to elements configuring the defect in the thin film with the mode of the spectrum. As described previously in FIGS. 21A and 21B, the size of the electron dispersion region of the electron beam EB set for EDX analysis differs depending on the acceleration voltage of the electron beam EB. However, even if the acceleration voltage of the electron beam EB is the same, as shown in FIGS. 29A and 29B, the size of the electron dispersion region differs in accordance with the material irradiated by the electron beam EB. FIG. 29A shows the electron dispersion region 23 of a case where the electron beam EB is irradiated on $SiO_2$, and FIG. 29B shows the electron dispersion region 23 of a case where the electron. beam EB is irradiated on W under the same conditions as FIG. 29A, and the electron dispersion region 23 becomes smaller in the case where the electron beam EB is irradiated on W.

During a step of forming a certain thin film, in a case where it is understood that a defect has arisen in this step by comparing inspection data before and after the formation, at the time EDX analysis is conducted with respect to the defect within the thin film, it is preferable to set the irradiation conditions of the electron beam EB so that at least the electron dispersion region is dispersed in a range corresponding to the thickness of the thin film. Thus, the irradiation conditions of the electron beam EB may be set in accordance with the film material and film thickness of the thin film so that the electron dispersion region of the electron beam EB falls within this range.

At this time, when the numerical value of the acceleration voltage or the like of the electron beam EB is used as a setting heading of the user, the user himself/herself must examine the adequate acceleration voltage or the like each time processing conditions are changed, and the burden on the user increases.

Thus, items including at least the composition and film thickness of the thin film are used as input condition for setting the acceleration voltage, and the numerical value of the acceleration voltage and the like is not used as a direct input item, to create a configuration for implementing separate conversion. A specific example of the GUI of conditions setting (EB conditions setting screen) is shown in FIG. 30.

In FIG. 30, in the EB conditions setting screen 29, the user inputs the step name serving as the analysis target and the material and thickness of the film corresponding to this. By operating a reference button 30a, the user can reference step names registered in advance in a server. Also, by operating a reference button 30b, the periodic table of the elements is displayed, and the user can input the corresponding element by clicking that element. At this time, plural elements and their respective component ratios can be inputted so that compounds can also be inputted.

As the EB conditions corresponding to the composition of the film and the thickness of the film, the numerical value of the acceleration voltage can be determined using, for example, the following method. First, the thickness of a thin film is varied on Si in a thin film step used in the production of semiconductors, plural samples are created, whether or not Si is detected in each sample is used as a determination standard, acceleration voltage conditions adequate for each film thickness are experimentally determined, and, on the basis of the experimental data, acceleration voltage conditions adequate for other film thicknesses other than the samples are analogized using an appropriate statistical method such as least mean square approximation.

Alternatively, simulation may be conducted for each of plural acceleration voltage conditions using a simulator such as a Monte Carlo simulator, and an acceleration voltage that becomes equal to the film thickness where the dispersion region (electron dispersion region) of the electron beam EB is inputted may be automatically selected.

The user may register the information of the film material and film thickness as a recipe, or a construction device may be specified from a processing history of semiconductor wafers and a processing recipe may be read from the construction device. In this case, the recipe is not the film thickness itself, but in a case where it is described with a processing time, the relation between the film thickness and the processing time may be acquired in advance and converted to the film thickness from the recipe data. Alternatively, specification data of each step may be registered in a server and the specification may be acquired. The registering server may be the data managing server 16 shown in FIGS. 2 and 3, or, even if it is a separate unillustrated server, the information can be shared via a network or a storage device such as a floppy disk.

In a case where the EB conditions are changed, sometimes it takes time for the output of the electron beam EB to become stable under the new EB conditions. The embodiments shown in FIGS. 22 and 23 form an example thereof, but in a case where the EB conditions are changed in accordance with the characteristics of the target defect of composition analysis, time for the output of the electron beam EB to be stabilized is necessary each time the EB conditions are changed. For this reason, defects for which the EB conditions are the same may be grouped in the same group and composition analysis may be conducted under the EB conditions corresponding to each group.

Figure 31:
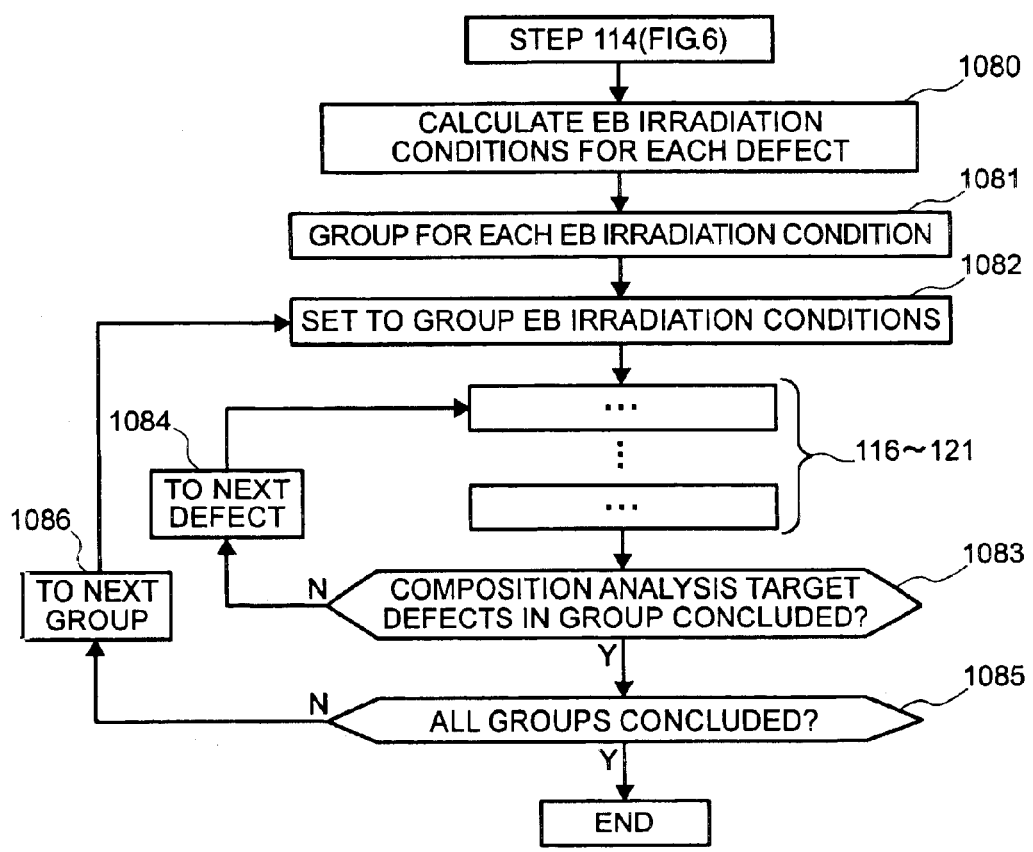
FIG. 31 is a flow chart showing a sixteenth embodiment of the method of analyzing the composition of defects according to the invention.

FIG. 31 is a flow chart showing the composition analysis operation portion of a fifteenth embodiment of the method of analyzing the composition of defects according to the invention using this sequence.

The review operation portion of the fifteenth embodiment is the same as that of the first embodiment shown in FIG. 6, and after the review operation of steps 100 to 112 of FIG. 6 have been conducted, thee composition analysis operation from step 114 shown in FIG. 31 is conducted, but here the series of review operations is omitted.

In FIG. 31, when the review operation ends and the selection of the defect to become the composition analysis target ends (step 114), first, the EB conditions are calculated as described above for each target defect of composition analysis (step 1080). Then, all target defects of composition analysis are grouped so that defects of the same EB conditions are grouped into the same groups (step 1081).

Then, one optional group is selected to serve as a composition analysis target group, the EB conditions are set to EB conditions corresponding to this composition analysis target group (step 1082), the operations of steps 116 to 121 of FIG. 6 are conducted with respect tone of the defects of the composition analysis target group, and a composition spectrum is obtained. In this manner, when the composition analysis operation of this defect ends, in a case where there are unanalyzed defects in the same composition analysis target group (step 1083), the next target defect of composition analysis is determined (step 1084), and the composition analysis operation is conducted with respect to this target defect of composition analysis (steps 116 to 121).

In this manner, the analysis operation is conducted under the same EB conditions with respect to the defects of the composition analysis target group and a composition spectrum is acquired for each, and when the composition analysis operation with respect to all defects of the composition analysis target group ends (step 1083), a next group is used as the composition analysis target group (steps 1085 and 1086), the EB conditions corresponding to this composition analysis target group are set (step 1082) with respect to each defect of this composition analysis target group, the composition analysis operation is conducted, and composition spectrums are obtained.

In this manner, the EB conditions corresponding to each are set (step 1082) with respect to all of the groups and composition spectrums are obtained with respect to all target defects of composition analysis.

In this manner, the frequency with which the EB conditions are changed can be minimized, the time necessary for stabilization of the output of the electron beam EB accompanying changes in the EB conditions can be minimized, and a higher throughput can be realized.

With respect to the second embodiment shown in FIG. 7 also, from step 115 on can be replaced with the series of operations from step 1080 shown in FIG. 31, whereby the same effects can be obtained. However, in this case, steps 116 to 121 in FIG. 31 become the series of operations of steps 201, 202 and 121 in FIG. 7.

Also, in the fifteenth embodiment shown in FIG. 31, the order of defects whose composition is to be analyzed may be changed so that the moving amount of the X-Y stage 7 for each group is minimized. For example, of the same composition analysis target group, the defect closest to th semiconductor wafer may be used as the first defect in the group to be compositionally analyzed, and when the composition analysis of the target defect of composition analysis ends, the defect closest in distance to this defect may be the next target defect of composition analysis. The order of composition analysis may be configured so that the next target defect of composition analysis is determined after the composition analysis of the first defect ends. However, the next target defect of composition analysis may also be determined before the composition analysis of the first defect is conducted. Alternatively, the order of composition analysis processing may be determined with respect to all defects in the composition analysis target groups before the composition analysis of the first composition analysis target group is conducted. By determining the order of the defects to be compositionally analyzed in this manner, the movement amount of the X-Y stage 7 can be reduced and throughput can be improved.

It should be noted that, although the method of composition analysis in each of the above-described embodiments used ED, the present invention is not limited thereto. Any method can be used as long as composition analysis can be conducted by irradiating an energy beam also including beams other than electron beams such as light beams.

As described above, according to the invention, after the stage has been moved to the defect position, the irradiation position of the electron beam for composition analysis is identified using the acquired image and the electron beam is slanted and irradiated on this irradiation position, so that highly precise and highly efficient positioning of the irradiation position of the electron beam can be realized.

Also, because the irradiation conditions of the electron beam can be changed in accordance with characteristics of the defect, highly sensitive composition analysis can be realized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of analyzing the compositions of defects, the method comprising the steps of:

moving a stage and setting a sample placed on the stage to an observation position;

obtaining a secondary particle image of a first resolution of the sample by irradiating and scanning a first electron beam focused on the sample set at the observation position and detecting secondary particles emitted from the sample;

determining the position of a defect on the sample using the secondary particle image of the first resolution of the sample;

obtaining a secondary particle image of a second resolution of the sample by irradiating and scanning an electron beam focused on the determined position of the defect and detecting secondary particles emitted from the sample;

obtaining information of a defect region on the sample using the secondary particle image of the second resolution of the sample;

selecting a target defect to be analyzed on the basis of the obtained information of the defect region; and obtaining information of the composition of the target defect by irradiating a second electron beam focused on the selected target defect and analyzing the selected target defect.

2. The method of analyzing the composition of defects of claim 1, wherein the secondary particle image of the second resolution has a higher resolution than that of the secondary particle image of the first resolution.

3. The method of analyzing the composition of defects of claim 1, wherein during the step of determining the position of the defect, the position of the defect on the sample is determined by comparing secondary particle images of the first resolution of the sample obtained by irradiating and scanning the first electron beam and detecting secondary particles emitted from the sample.

4. A method of analyzing the composition of defects, the method comprising the steps of:
   moving a stage and setting a sample placed on the stage to an observation position;
   obtaining an image of the sample by irradiating and scanning an electron beam focused on the sample set at the observation position;
   determining the positions of plural defects on the sample from the image of the sample;
   acquiring magnification images of the plural defects by irradiating and scanning an electron beam focused on the basis of the determined position information;
   extracting a target defect to be analyzed on the basis of the magnification images of the acquired plural defects; and
   analyzing the extracted target defect to obtain information of the composition of the target defect.

5. The method of analyzing the composition of defects of claim 4, wherein during the step of acquiring the magnification images, the magnification images are acquired so that an image of the defects determined on the basis of the information of the determined positions of the defects is positioned in the center.

6. The method of analyzing the composition of defects of claim 4, further comprising the step of classifying the plural defects using the acquired magnification images of the plural defects, wherein during the step of extracting the target defect to be analyzed, the target defect to be analyzed is extracted on the basis of the acquired magnification images of the plural defects and information obtained by classifying the plural defects.

7. The method of analyzing the composition of defects of claim 4, wherein during the step of obtaining the information of the composition of the target defect, the extracted target defect is analyzed using an energy dispersive X-ray spectrometer (EDX).

8. The method of analyzing the composition of defects of claim 4, wherein during the step of obtaining th information of the composition of the target defect, the extracted target defect is analyzed using Auger electron spectroscopy.

9. The method of analyzing the composition of defects of claim 4, further comprising the step of displaying, on a same screen, the acquire magnification images and the obtained information of the composition of the target defect.

10. A method of analyzing the compositions of defects, the method comprising the steps of:
    moving a stage and setting a sample placed on the stage to an observation position;
    obtaining an image with a scanning electron microscope (SEM image) of a first resolution of the sample by irradiating and scanning an electron beam focused on the sample set at the observation position;
    determining the position of a defect on the sample using the SEM image of the first resolution of the sample;
    acquiring an SEM image of a second resolution, which is higher than the first resolution, of the sample on the basis of the determined position information of the defect;
    obtaining an image of a region of the defect from the acquired SEM image of the second resolution of the sample;
    selecting a target defect to be analyzed using the obtained image of the region of the defect; and
    obtaining information of the composition of the target defect by analyzing the selected target defect.

11. The method of analyzing the composition of defects of claim 10, wherein during the step of determining the position of the defect, the position of the defect on the sample is determined by comparing secondary particle images of the first resolution of the sample obtained by the SEM image of the first resolution.

12. The method of analyzing the composition of defects of claim 10, wherein during the step of acquiring the SEM image of the second resolution, the SEM image of the second resolution is acquired so that the image of the defect determined on the basis of the determined information of the position of the defect is positioned in the center using the SEM image of the first resolution.

13. The method of analyzing the composition of defects of claim 10, further comprising the step of classifying the plural defects using the acquired magnification images of the plural defects, wherein during the step of extracting the target defect to be analyzed, the target defect to be analyzed is extracted on the basis of the acquired magnification images of the plural defects and the information obtained by classifying the plural defects.

14. The method of analyzing the composition of defects of claim 10, wherein during the step of obtaining the information of the composition of the target defect, the extracted target defect is analyzed using an energy dispersive X-ray spectrometer r (EDX).

15. The method of analyzing the composition of defects of claim 10, wherein during the step of obtaining the information of the composition of the target defect, the extracted target defect is analyzed using Auger electron spectroscopy.

16. The method of analyzing the composition of defects of claim 10, further comprising the step of displaying, on a same screen, the acquire SEM image of the second resolution and the obtained information of the composition of the target defect.

17. A device for analyzing the compositions of defects, the device comprising:
    stage means for placing a sample thereon and setting the sample at an observation position;
    secondary particle image acquiring means for obtaining a secondary particle image of a first resolution of the sample by irradiating and scanning an electron beam focused on the sample set at the observation position by the stage means and detecting secondary particles emitted from the sample;
    defect detecting means for determining the position of a defect on the sample using the secondary particle image of the sample acquired by the secondary particle image acquiring means;
    position information acquiring means for obtaining information of a defect region on the sample from the secondary particle image of a second resolution of the defect obtained by irradiating and scanning the electron beam focused on the position of the defect determined by the defect detecting means and detecting the secondary particles emitted from the sample with the secondary particle image acquiring means;
    defect selecting means for selecting a target defect to be analyzed on the basis of the information of the defect region obtained with the position information acquiring means;

analyzing means for analyzing the target defect selected by the defect selecting means to obtain information of the composition of the target defect; and display means for displaying the secondary particle image of the second resolution of the defect acquired with the position information acquiring means and the information of the composition of the target defect obtained by analyzing the target defect with the analyzing means.

18. The device for analyzing the composition of defects of claim 17, further comprising defect classifying means for classifying the defect using the secondary particle image of the second resolution of the defect acquired with the position information acquiring means, wherein the defect selecting means the target defect to be analyzed on the basis of the information of the defect region acquired by the position information acquiring means and the information obtained by analyzing the defect with the defect classifying means.

19. The device for analyzing the composition of defects of claim 17, wherein the analyzing means is disposed with an energy dispersive X-ray spectrometer (EDX).

20. The device for analyzing the composition of defects of claim 17, wherein the analyzing means is disposed with an analyzer using Auger electron spectroscopy.

21. A device for analyzing the compositions of defects, the device comprising:

stage means for placing a sample thereon and setting the sample at an observation position, the stage means being movable in at least one axial direction;

SEM image acquiring means for obtaining an SEM image of the sample set at the observation position by the stage means;

defect detecting means for determining the position of a defect on the sample using the SEM image of a first resolution of the sample acquired by the SEM image acquiring means;

defect region information acquiring means for obtaining an image of a region of the defect from the SEM image of a second resolution of the defect acquired by the SEM image acquiring means on the basis of the position information of the defect determined by the defect detecting means;

defect selecting means for selecting a target defect to be analyzed using the image of the region of the defect obtained by the defect region information acquiring means;

analyzing means for analyzing the target defect selected by the defect selecting means to obtain information of the composition of the target defect; and outputting means for outputting the information of the composition of the target defect obtained by analyzing the target defect with the analyzing means.

22. The device for analyzing the composition of defects of claim 21, wherein the analyzing means is disposed with an energy dispersive X-ray spectrometer (EDX).

23. The device for analyzing the composition of defects of claim 21, wherein the analyzing means is disposed with an analyzer using Auger electron spectroscopy.

* * * * *